US009015263B2

(12) United States Patent
Styler et al.

(10) Patent No.: US 9,015,263 B2
(45) Date of Patent: Apr. 21, 2015

(54) DOMAIN NAME SEARCHING WITH REPUTATION RATING

(71) Applicant: Go Daddy Operating Company, LLC, Scottsdale, AZ (US)

(72) Inventors: Joseph Styler, Gilbert, AZ (US); Wayne Thayer, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

(21) Appl. No.: 14/031,978

(22) Filed: Sep. 19, 2013

(65) Prior Publication Data

US 2014/0032589 A1 Jan. 30, 2014

Related U.S. Application Data

(60) Continuation-in-part of application No. 12/723,397, filed on Mar. 12, 2010, which is a division of application No. 11/866,970, filed on Oct. 3, 2007, which is a continuation-in-part of application No. 10/977,373, filed on Oct. 29, 2004, now Pat. No. 8,117,339.

(51) Int. Cl.

| | |
|---|---|
| ***G06F 15/16*** | (2006.01) |
| ***G06F 17/30*** | (2006.01) |
| ***G06Q 10/10*** | (2012.01) |
| *G06F 15/173* | (2006.01) |
| *G06Q 30/00* | (2012.01) |

(52) U.S. Cl.

CPC .......... *G06F 17/3097* (2013.01); *G06Q 10/107* (2013.01); *Y10S 707/9994* (2013.01)

(58) Field of Classification Search

None

See application file for complete search history.

(56) References Cited

U.S. PATENT DOCUMENTS

| | | | |
|---|---|---|---|
| 5,657,390 | A | 8/1997 | Elgamal et al. |
| 5,825,890 | A | 10/1998 | Elgamal et al. |
| 5,872,848 | A | 2/1999 | Romney et al. |
| 5,892,904 | A | 4/1999 | Atkinson et al. |
| 6,029,192 | A | 2/2000 | Hill et al. |
| 6,085,242 | A | 7/2000 | Chandra |
| 6,263,447 | B1 | 7/2001 | French et al. |
| 6,332,158 | B1 | 12/2001 | Risley et al. |
| 6,446,133 | B1 | 9/2002 | Tan et al. |

(Continued)

FOREIGN PATENT DOCUMENTS

| | | |
|---|---|---|
| JP | 2001167017 | 6/2001 |

OTHER PUBLICATIONS

"Domain Name Search." Jan. 31, 2001. www.domainsearch.com.

(Continued)

*Primary Examiner* — Wen-Tai Lin

(74) *Attorney, Agent, or Firm* — Karl Fazio

(57) ABSTRACT

A method includes calculating, by at least one server communicatively coupled to a network, a rating for a domain name. The rating is based in part on reputation data for the domain name. The method includes receiving, by the at least one server, a domain name query from a requester, and forming, by the at least one server, a listing of candidate domain names using the domain name query. An inclusion of the domain name into the listing of candidate domain names or an order placement of the domain name within the listing of candidate domain names is a function of the rating for the domain name. The method includes returning, by the at least one server, the listing of candidate domain names to the requester.

22 Claims, 25 Drawing Sheets

START
Request Certificate from CA — 705
Obtain Registration Date of Subscriber's Domain Name — 1145
CA Verifies Subscriber based on Registration Date — 1150
Successful Verification? — 715
No: Deny Certificate — 720
Yes: Issue Certificate — 725
END

(56) References Cited

U.S. PATENT DOCUMENTS 6,480,508 B1 11/2002 Mwikalo et al.
6,560,634 B1 5/2003 Broadhurst
6,687,746 B1 2/2004 Shuster et al.
6,725,269 B1 4/2004 Megiddo et al.
6,745,248 B1 6/2004 Gardos et al.
6,856,963 B1 2/2005 Hurwitz
6,876,997 B1 4/2005 Rorex et al.
6,880,007 B1 4/2005 Gardos et al.
6,895,430 B1 5/2005 Schneider
6,976,090 B2 12/2005 Ben-Shaul et al.
7,039,697 B2 5/2006 Bayles
7,069,323 B2 6/2006 Gardos et al.
7,072,944 B2 7/2006 Ladonde et al.
7,076,541 B1 7/2006 Burstein et al.
7,099,956 B2 8/2006 Shuster et al.
7,136,932 B1 11/2006 Schneider
7,238,661 B2 7/2007 Glynn et al.
7,287,002 B1 10/2007 Asher et al.
7,296,026 B2 11/2007 Patrick et al.
7,299,491 B2 11/2007 Shelest et al.
7,319,992 B2 1/2008 Gaos
7,320,021 B2 1/2008 Lalonde et al.
7,346,899 B2 3/2008 Ebro et al.
7,350,229 B1 3/2008 Lander
7,356,837 B2 4/2008 Asghari-Kamrani et al.
7,386,438 B1 6/2008 Franz et al.
7,400,981 B1 7/2008 Rigney
7,437,558 B2 10/2008 Fenton et al.
7,467,140 B2 12/2008 Monroe
7,467,206 B2 * 12/2008 Moore et al. .................. 709/225
7,475,425 B2 1/2009 Bantz et al.
7,515,289 B2 4/2009 Ohtuka
7,516,418 B2 4/2009 Herley et al.
7,523,310 B2 4/2009 Narin et al.
7,542,969 B1 6/2009 Rappaport et al.
7,596,515 B2 * 9/2009 Eckel, Jr. ..................... 705/26.1
7,606,858 B2 10/2009 King et al.
7,668,119 B2 2/2010 Thubert et al.
7,680,819 B1 3/2010 Mellmer et al.
7,689,458 B2 3/2010 Heckerman et al.
7,711,850 B2 5/2010 Ronen et al.
7,711,851 B2 5/2010 Ronen et al.
7,734,745 B2 6/2010 Gloe
7,761,565 B2 7/2010 Adelman et al.
7,761,566 B2 7/2010 Adelman et al.
7,797,413 B2 9/2010 Adelman et al.
7,805,426 B2 9/2010 Leung et al.
7,822,868 B2 10/2010 Gassewitz et al.
7,877,432 B2 1/2011 Maxson et al.
7,953,812 B2 5/2011 Ruiz
7,953,813 B2 5/2011 Ruiz
7,962,438 B2 6/2011 Adelman et al.
8,015,006 B2 9/2011 Kennewick et al.
8,046,693 B2 * 10/2011 Oliver ........................... 715/738
8,069,187 B2 11/2011 Adelman et al.
8,156,180 B2 4/2012 Adelman
8,171,070 B2 5/2012 Zimmerman et al.
8,171,110 B1 5/2012 Parsons et al.
8,195,652 B1 6/2012 Parsons et al.
8,209,379 B2 6/2012 Adelman
8,234,351 B2 7/2012 Curran et al.
8,280,952 B1 10/2012 Parsons et al.
8,370,217 B1 2/2013 Parsons et al.
8,380,800 B2 2/2013 Ruiz
8,385,589 B2 2/2013 Erol et al.
8,515,969 B2 8/2013 Nicks et al.
2001/0021931 A1 9/2001 Vaughan
2001/0025342 A1 9/2001 Uchida
2001/0039543 A1 11/2001 Mann et al.
2002/0010795 A1 1/2002 Brown
2002/0026439 A1 2/2002 Monroe
2002/0040301 A1 4/2002 Royall, Jr. et al.
2002/0061021 A1 5/2002 Dillon
2002/0065903 A1 5/2002 Fellman
2002/0069129 A1 6/2002 Akutsu et al.
2002/0078152 A1 6/2002 Boone
2002/0091703 A1 7/2002 Bayles
2002/0091827 A1 7/2002 King et al.
2002/0120537 A1 8/2002 Morea et al.
2002/0129013 A1 9/2002 Thomas
2002/0133365 A1 9/2002 Grey et al.
2002/0138291 A1 9/2002 Vaidyanathan et al.
2002/0152206 A1 10/2002 Gusler et al.
2002/0173981 A1 11/2002 Stewart
2002/0184172 A1 12/2002 Shlain et al.
2002/0194373 A1 12/2002 Choudhry
2002/0198824 A1 12/2002 Cook
2002/0198866 A1 12/2002 Kraft et al.
2003/0037131 A1 2/2003 Verma
2003/0078894 A1 4/2003 Kon
2003/0105955 A1 6/2003 Carroll et al.
2003/0115475 A1 6/2003 Russo et al.
2003/0120649 A1 6/2003 Uchino et al.
2003/0126431 A1 7/2003 Beattie et al.
2003/0132967 A1 7/2003 Gangadharan
2003/0149690 A1 8/2003 Kudlacik et al.
2003/0177274 A1 9/2003 Sun
2003/0182365 A1 9/2003 Toda et al.
2003/0182573 A1 9/2003 Toneguzzo et al.
2004/0008374 A1 1/2004 Choi
2004/0068436 A1 4/2004 Boubek et al.
2004/0073691 A1 4/2004 Sun
2004/0093331 A1 5/2004 Garner et al.
2004/0098375 A1 5/2004 DeCarlo, III
2004/0122926 A1 6/2004 Moore et al.
2004/0148238 A1 7/2004 Bookstaff et al.
2004/0162786 A1 8/2004 Cross et al.
2004/0167982 A1 8/2004 Cohen et al.
2004/0169678 A1 9/2004 Oliver
2004/0177120 A1 9/2004 Kirsch
2004/0181430 A1 9/2004 Fotsch et al.
2004/0199520 A1 10/2004 Ruiz et al.
2005/0021588 A1 1/2005 Zimmerman et al.
2005/0044423 A1 2/2005 Mellmer et al.
2005/0060417 A1 3/2005 Rose
2005/0071741 A1 3/2005 Acharya et al.
2005/0080786 A1 4/2005 Fish et al.
2005/0080855 A1 4/2005 Murray
2005/0102354 A1 5/2005 Hollenbeck et al.
2005/0125451 A1 6/2005 Mooney
2005/0144520 A1 6/2005 Tuma et al.
2005/0193076 A1 9/2005 Flury et al.
2005/0198095 A1 9/2005 Du et al.
2005/0216290 A1 9/2005 Sachs et al.
2005/0234363 A1 10/2005 Xue
2005/0257261 A1 * 11/2005 Shraim et al. ................... 726/22
2005/0268237 A1 12/2005 Crane et al.
2005/0289242 A1 12/2005 Ruiz
2006/0004784 A1 1/2006 Ableman
2006/0004896 A1 1/2006 Nelson et al.
2006/0005009 A1 1/2006 Ball et al.
2006/0009994 A1 1/2006 Hogg et al.
2006/0015472 A1 1/2006 Ahlander et al.
2006/0015722 A1 1/2006 Rowan et al.
2006/0015942 A1 * 1/2006 Judge et al. ..................... 726/24
2006/0020667 A1 1/2006 Wang et al.
2006/0031314 A1 2/2006 Brahms et al.
2006/0031315 A1 2/2006 Fenton et al.
2006/0031319 A1 2/2006 Nelson et al.
2006/0069697 A1 3/2006 Shraim et al.
2006/0095586 A1 5/2006 Adelman et al.
2006/0101155 A1 5/2006 Damour et al.
2006/0106793 A1 5/2006 Liang
2006/0122889 A1 6/2006 Burdick et al.
2006/0136908 A1 6/2006 Gebhart et al.
2006/0155656 A1 7/2006 Kreder, III et al.
2006/0157560 A1 7/2006 Skor et al.
2006/0161681 A1 7/2006 King et al.
2006/0168057 A1 7/2006 Warren et al.
2006/0171523 A1 8/2006 Greenwell
2006/0184620 A1 8/2006 Melet et al.
2006/0206572 A1 9/2006 Lalonde et al.

(56) References Cited

U.S. PATENT DOCUMENTS

2006/0212930 A1 9/2006 Shull et al.
2006/0212931 A1 9/2006 Shull et al.
2006/0230039 A1 10/2006 Shull et al.
2006/0235824 A1 10/2006 Cheung et al.
2006/0253583 A1 11/2006 Dixon
2006/0253584 A1 11/2006 Dixon et al.
2006/0271668 A1 11/2006 Parsons et al.
2006/0287936 A1 12/2006 Jacobson
2007/0005564 A1 1/2007 Zehner
2007/0061336 A1 3/2007 Ramer et al.
2007/0083423 A1 4/2007 Delbridge
2007/0094365 A1 4/2007 Nussey et al.
2007/0174255 A1 7/2007 Sravanapudi et al.
2007/0198495 A1 8/2007 Buron et al.
2007/0204168 A1 8/2007 Cameron et al.
2007/0208740 A1 9/2007 Nye
2007/0287473 A1 12/2007 Dupray
2007/0294431 A1 12/2007 Adelman et al.
2007/0299815 A1 12/2007 Starbuck et al.
2008/0005127 A1 1/2008 Schneider
2008/0040329 A1 2/2008 Cussen et al.
2008/0198162 A1 8/2008 Ni
2008/0201258 A1 8/2008 D'Ambrosio
2008/0222125 A1 9/2008 Chowdhury
2008/0320591 A1 12/2008 Fenton et al.
2009/0013182 A1 1/2009 Asghari-Kamrani et al.
2009/0094379 A1 4/2009 Lu et al.
2009/0119198 A1 5/2009 Manriquez et al.
2009/0125308 A1 5/2009 Ambler
2009/0133580 A1 5/2009 Geurtz
2009/0164598 A1 6/2009 Nelson et al.
2009/0182884 A1 7/2009 Datta et al.
2009/0222368 A1 9/2009 McCauley et al.
2009/0241066 A1 9/2009 Costello
2009/0254545 A1 10/2009 Fisken
2009/0292696 A1 11/2009 Shuster
2009/0307256 A1 12/2009 Tiyyagura
2010/0042688 A1 2/2010 Maghraby
2010/0058210 A1 3/2010 Johnson
2010/0070448 A1 3/2010 Omoigui
2010/0115043 A1 5/2010 King et al.
2010/0145678 A1 6/2010 Csomai et al.
2010/0146001 A1 6/2010 Lee
2010/0146119 A1 6/2010 Lee
2010/0169492 A1 7/2010 Lee
2010/0274668 A1 10/2010 Langston et al.
2010/0306832 A1 12/2010 Mu et al.
2011/0087769 A1 4/2011 Holmes et al.
2012/0047577 A1 2/2012 Costinsky

OTHER PUBLICATIONS

Van Couvering, DomainsBot Investigation#2, Jan. 22, 2006, pp. 1-6.
"Domain name Hijacking: Incidents, Threats, Risks, and Remedial Actions", A Report from the ICANN Security and Stability Advisory Committee, pp. 1-48, Jul. 2005.
Go Daddy, Oct. 14, 2007, pp. 1-371, http://web.archive.org/20071011054029/http://help.godaddy.com/article.php?article_id=1122.
Business EditorsIHigh Tech Writers "Network Solutions' Affiliate Program to Offer Expanded Internet Identity Services Through Storefront", Business Wire, May 11, 2000, p. 1.
Board of Patent Appeals and Interferences, Decision on Appeal for U.S. Appl. No. 10/407,778, decided Sep. 25, 2008.
Moffat, RSS—A Primer for Publihsers & Content Proivders, p. 3, Aug. 20, 2003.
Internet print-out of http://web.archive.org/web/20000901042248/http://www.datex.net/ecommerce/glossary.htm, Internet archive of datex.net, Sep. 1, 2000.
Mockapetris, RFC 1035, Domain Names—Implementation and Specification, Nov. 1, 1987.
Dictionary.com, "register," in Dictionary.com Unabridged. Source location: Random House, Inc. http://dictionary.reference.com/browse/register, Jul. 16, 2010.
Dictionary.com, "reputation," in Dictionary.com Unabridged. Source location: Random House, Inc. http://dictionary.reference.com/browse/reputationr, Jul. 16, 2010.
Dictionary.com, "satisfactory," in Dictionary.com Unabridged. Source location: Random House, Inc. http://dictionary.reference.com/browse/satisfactory, Jul. 16, 2010.
Dictionary.com, "subscribe," in Dictionary.com Unabridged. Source location: Random House, Inc. http://dictionary.reference.com/browse/subscribe, Jul. 16, 2010.
Google SafeSearch Filtering (http://web.archive.org/web/20030702191745/http://www.google.com/intl/en/help/customize.html), Jul. 2003, WaybackMachine.
Reputation-Based Mail Flow Control. IronPort Systems, Inc. http://www.ironport.com/pdf/ironport_c60_rep_based_paper.pdf, 2002.
About MogileFS http://www.danga.com/mogilefs/, May 10, 2010.
Reputation Network Analysis for Email Filtering. http://www.ceas.cc/papers-2004/177.pdf, Jul. 2004.
Pew Internet Project Data Memo. http://www.pewinternet.org/pdfs/PIP_Datamemo_Reputation.pdf, Oct. 2004.
Josang et al., The Beta Reputation System, 2002.
Maximilien et al., "Conceptual Model of Web Service Reputation", 2002.

* cited by examiner

DOMAIN NAME SEARCHING WITH REPUTATION RATING

CROSS REFERENCE TO RELATED PATENT APPLICATIONS

This application is a continuation-in-part of U.S. patent application Ser. No. 12/723,397 filed Mar. 12, 2010, which is a divisional of U.S. patent application Ser. No. 11/866,970 to Warren Adelman et. al. filed on Oct. 3, 2007, which is a continuation-in-part of U.S. patent application Ser. No. 10/977,373 filed Oct. 29, 2004. All prior applications are incorporated herein in their entirety by reference.

This application also relates to copending U.S. patent application Ser. No. 10/976,834 to Warren Adelman et. al. filed on Oct. 29, 2004, Ser. No. 10/976,547 to Warren Adelman et. al. filed on Oct. 29, 2004, Ser. No. 11/306,612 to Warren Adelman et. al. filed on Jan. 4, 2006, Ser. No. 11/746,484 to Warren Adelman et. al. filed on May 9, 2007, Ser. No. 11/746,505 to Warren Adelman et. al. filed on May 9, 2007, Ser. No. 11/746,522 to Warren Adelman et. al. filed on May 9, 2007, Ser. No. 11/866,983 to Warren Adelman et. al. filed on Oct. 3, 2007, Ser. No. 11/866,984 to Warren Adelman et. al. filed on Oct. 3, 2007, Ser. No. 11/866,989 to Warren Adelman et. al. filed on Oct. 3, 2007, Ser. No. 12/409,494 to Warren Adelman et. al. filed on Mar. 24, 2009, Ser. No. 12/409,495 to Warren Adelman et. al. filed on Mar. 24, 2009, Ser. No. 12/409,492 to Warren Adelman et. al. filed on Mar. 24, 2009, Ser. No. 12/482,297 to Warren Adelman et. al. filed on Jun. 10, 2009, Ser. No. 12/482,306 to Warren Adelman et. al. filed on Jun. 10, 2009.

FIELD OF THE INVENTION

The present invention relates to systems and methods for tracking domain name related reputations, such as reputations of domain names, reputations of domain name registrants, and reputations of email addresses.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between users of computers. Hundreds of millions of people around the world have access to computers connected to the Internet via Internet Service Providers (ISPs). Content providers place multimedia information, i.e. text, graphics, sounds, and other forms of data, at specific locations on the Internet referred to as websites. The combination of all the websites and their corresponding web pages on the Internet is generally known as the World Wide Web (WWW) or simply web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Websites may consist of a single webpage, but typically consist of multiple interconnected and related web pages. Websites, unless extremely large and complex or exposed to unusual traffic demands, typically reside on a single server and are prepared and maintained by a single individual or entity. Menus and links may be used to move between different web pages within the website or to move to a different website as is known in the art. The interconnectivity of web pages enabled by the Internet can make it difficult for Internet users to tell where one website ends and another begins.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user may then view other web pages at the same website or move to an entirely different website using the browser.

Websites allow businesses and individuals to share their information with a large number of Internet users. Further, many products and services are offered for sale on the Internet, thus elevating the Internet to an essential tool of commerce.

Electronic mail or email is another important part of the Internet. Email messages may contain, for example, text, images, links, and attachments. Email is one of the most widely used methods of communication over the Internet due to the variety of data that may be transmitted, large number of available recipients, speed, low cost and convenience.

Email messages may be sent, for example, between friends, family members or between coworkers thereby substituting for traditional letters and office correspondences in many cases. This is made possible because the Internet has very few restrictions on who may send emails, the number of emails that may be transmitted and who may receive the emails. The only real hurdle for sending emails is the requirement that the sender must know the email address (also called network mailbox) of the intended recipient.

Email messages travel across the Internet, typically passing from server to server, at amazing speeds achievable only by electronic data. The Internet provides the ability to send an email anywhere in the world, often in less than a few seconds. Delivery times are continually being reduced as the Internet's ability to transfer electronic data improves.

Most Internet users find emails to be much more convenient than traditional mail. Traditional mail requires stamps and envelopes to be purchased and a supply maintained, while emails do not require the costs and burden of maintaining a supply of associated products. Emails may also be sent with the click of a few buttons, while letters typically need to be transported to a physical location, such as a mail box, before being sent.

Once a computer and an Internet connection have been purchased, there are typically few additional costs associated with sending emails. This remains true even if millions, or more, of emails are sent by the same user. Emails thus have the extraordinary power of allowing a single user to send one or more messages to a very large number of people at an extremely low cost.

The Internet has become a very valuable tool for business and personal communications, information sharing, commerce, etc. However, some individuals have abused the Internet. Among such abuses are phishing, spam, and posting of illegal content on a website (e.g. child pornography). Phishing is the luring of sensitive information, such as passwords, credit card numbers, bank accounts and other personal information, from an Internet user by masquerading as someone trustworthy with a legitimate need for such information. Spam or unsolicited email is flooding the Internet with many copies of the identical or nearly identical message, in an attempt to force the message on people who would not otherwise choose to receive it. Most spam is commercial advertising, often for dubious products, get-rich-quick schemes, or quasi-legal services.

A single spam message received by a user uses only a small amount of the user's email account's allotted disk space, requires relatively little time to delete and does little to obscure the messages desired by the user. Even a small number of spam messages, while still annoying, would nonetheless cause relatively few real problems. However, the number of spam transmitted over the Internet is growing at an alarming rate. While a single or small number of spam messages are annoying, a large number of spam can fill a user's email account's allotted disk space thereby preventing the receipt of desired emails. Also, a large number of spam can take a significant amount of time to delete and can even obscure the presence of desired emails in the user's email account.

Spam currently comprises such a large portion of Internet communications that they actually cause data transmission problems for the Internet as a whole. Spam creates data log jams thereby slowing the delivery of more desired data through the Internet. The larger volume of data created by spam also requires the Internet providers to buy larger and more powerful, i.e. more expensive, equipment to handle the additional data flow caused by the spam.

Spam has a very poor response rate compared to other forms of advertisement. However, since almost all of the costs/problems for transmitting and receiving spam are absorbed by the recipient of the spam and the providers of the hardware for the Internet, spam is nevertheless commercially viable for a spammer due to the extremely low cost of transmitting the spam.

There are various techniques used for combating Internet abuses. Among them: secure certificates, spam filtering, email challenge-response systems, etc. To obtain a secure certificate, a Certification Authority usually authenticates the owner of the domain name, thus allowing the owner of the domain name to employ one of the encryption protocols, e.g. SSL (Secure Socket Layer), for Internet communications. Spam filtering may utilize keywords, various probability algorithms, or white and/or black lists for email addresses, domain names, and/or IP (Internet Protocol) addresses, etc.

Below are a few examples of the systems (some reputation-based) that combat spam.

The SENDERBASE system keeps track of the amount of email messages originating from various domain names and IP addresses. IRONPORT SYSTEMS INC., a company that maintains SENDERBASE.ORG, explains how it works in this example: "If a sender has high global volumes of mail-say 200 Million messages per day—from a network of 5 different domains and 1,700 IP addresses that have only been sending mail for 15 days yet have a high end user complaint rate and they don't accept incoming mail, they will have a very low reputation score [ . . . ]. If a sender is a Fortune 500 company, they will likely have much more modest global email volumes-say 500,000 messages per day-will have a smaller number of IPs and domains with a long sending history, they will accept incoming email and have low (or zero) end user complaint rates."

The Bonded Sender Program maintains a white list-like service. The participants of the service must adhere to the rules and post a bond to be included on the white list.

SPAMCOP maintains a black list of IP addresses and allows users to report spam to a centralized database.

Multiple solutions are created for establishing "societies" of trusted users. Some solutions keep track of user reputation or trust level.

CLOUDMARK, Inc. provides spam filtering and allows users to block or unblock messages manually. The users' votes on messages (blocking and unblocking) are reported to a centralized database, allowing for better spam filtering by reducing the number of false positives. Each CLOUDMARK user is assigned with a reputation (trust rating). If a malicious user unblocks a spam message, while a large number of other users block it, the malicious user's reputation will go down. If a user votes along the lines with the rest of the users, her/his reputation raises.

VERISIGN, Inc. maintains the list of domain names that were issued a VERISIGN SSL digital certificate, so called "Verified Domains List." The company plans to make the list accessible to third parties.

Some systems suggest publishing reputation data in the DNS (Domain Name System) records, e.g. Mailbox Reputation Network.

For the reputation-based systems to work properly, the sender's email address or at least its domain name part should be correct. Often malicious users forge (spoof) the sender's email address when they send out spam, viruses, or phishing email messages. Among the solutions to this problem are MICROSOFT's Sender ID and YAHOO's Domain Keys. The Sender ID proposal envisions publishing the sender's email IP address in the DNS records of the sender's server. This allows the receiver of the email message to compare the originating IP address in the email with the IP address published in the DNS. If they don't match, the email address was forged. The Domain Keys proposal utilizes public-private key infrastructure. The sender publishes its public key in the DNS records and digitally signs outgoing email messages with its private key. The receiver can validate the sender's signature using the sender's public key published in the DNS records.

A common mechanism for providing increased security includes the use of encrypted transactions using digital certificates (also known as secure certificates). One widely used security protocol is the Secure Socket Layer (SSL) protocol, which uses a hybrid public-key system in which public-key cryptography is used to allow a client and a server to securely agree on a secret session key.

SSL is a networking protocol developed by Netscape Communications Corp. and RSA Data Security, Inc. to enable secure network communications in a non-secure environment. More particularly, SSL is designed to be used in the Internet environment, where it operates as a protocol layer above the TCP/IP (Transmission Control Protocol/Internet Protocol) layers. The application code then resides above SSL in the networking protocol stack. After an application (such as an Internet browser) creates data to be sent to a peer in the network, the data is passed to the SSL layer where various security procedures are performed on it, and the SSL layer then passes the transformed data to the TCP layer. On the receiver's side of the connection, after the TCP layer receives incoming data it passes that data upward to the SSL layer where procedures are performed to restore the data to its original form. That restored data is then passed to the receiving application. The SSL protocol is described in U.S. Pat. No. 5,657,390 entitled "Secure Socket Layer Application Program Apparatus and Method." Multiple improvements to the SSL protocol were made in the Transport Layer Security (TLS) protocol, which is intended to gradually replace the SSL.

The protocols underlying the Internet (TCP/IP, for example) were not designed to provide secure data transmission. The Internet was originally designed with the academic and scientific communities in mind, and it was assumed that users of the network would be working in a non-adversarial, cooperative manner. As the Internet began to expand into a public network, usage outside these communities was relatively limited, with most of the new users located in large corporations. These corporations had the computing facilities to protect their users' data with various security procedures, such as firewalls, that did not require security to be built into the Internet itself. In the past several years, however, Internet usage has skyrocketed. Millions of people now use the Internet and the Web on a regular basis. These users perform a wide variety of tasks, from exchanging electronic mail messages to searching for information to performing business transactions. These users may access the Internet from home, from their cellular phone, or from a number of other environments where security procedures are not commonly available. To support the growth of the Internet as a viable place of doing business, often referred to as "electronic commerce" or simply "e-commerce", easily-accessible and inexpensive security procedures had to be developed. SSL is one popular solution, and is commonly used with applications that send and receive data using the HyperText Transfer Protocol (HTTP). HTTP is the protocol most commonly used for accessing that portion of the Internet referred to as the Web. When HTTP is used with SSL to provide secure communications, the combination is referred to as HTTPS. Non-commercial Internet traffic can also benefit from the security SSL provides. SSL has been proposed for use with data transfer protocols other than HTTP, such as Simple Mail Transfer Protocol (SMTP) and Network News Transfer Protocol (NNTP).

SSL is designed to provide several different but complementary types of security. First is message privacy. Privacy refers to protecting message content from being readable by persons other than the sender and the intended receiver(s). Privacy is provided by using cryptography to encrypt and decrypt messages. SSL uses asymmetric cryptography, also known as public-key cryptography (at least for establishing the connection or the so called "handshake"). A message receiver can only decrypt an encrypted message if the message creator used the message receiver's public key to encrypt the message and the message receiver uses his private key to decrypt the message.

Second, SSL provides data integrity for messages being transmitted. Data integrity refers to the ability for a message recipient to detect whether the message content was altered after its creation (thus rendering the message untrustworthy). A message creator passes the message through an algorithm which creates what is called a "message digest", or a "message authentication code". The message digest is a large number produced by applying hash functions to the message. A digitally signed digest is sent along with the message. When the message is received, the receiver also processes the message through the same algorithm, creating another digest. If the digest computed by the receiver does not match the digest sent with the message, then it can be assumed that the message contents were altered in some way after the message was created.

The third security feature SSL provided is known as authentication. Communications over the Internet take place as a sequence of electronic signals, without the communicating parties being able to see each other and visually determine with whom they are communicating. Authentication is a technique that helps to ensure that the parties are who they represent themselves to be, whether the party is a human user or an application program. For example, if a human user is buying goods over the Internet using a credit card, it is important for the human user to know that the application waiting on the other end of the connection for his credit card information is really the vendor he believes he is doing business with, and not an impostor waiting to steal his credit card information.

One advantage of SSL is that it is application protocol independent. A higher level protocol can layer on top of the SSL Protocol transparently. Thus, the SSL protocol provides connection security where encryption is used after an initial handshake to define a secret key for use during a session and where the communication partner's identity can be authenticated using, for example, a well known public certificate issuing authority. Examples of such well known Certification Authorities (CA) include Starfield Technologies, Inc. (a subsidiary of The Go Daddy Group, Inc.), RSA Data Security, Inc., VERISIGN, and EQUIFAX.

Authentication is important in establishing the secure connection as it provides a basis for the client to trust that the server, typically identified by its Universal Resource Locator (URL), is the entity associated with the server public key provided to the client and used to establish the secret session key. As noted above, this authentication may be provided through the use of certificates obtained by the server from one of the well known Certification Authorities. The certificate (such as a X.509 certificate) typically includes an identification of the server (such as its hostname), the server's public key, and a digital signature which is provided by the well known Certification Authority. The digital signature is used by a client receiving the certificate from a server to authenticate the identity of the server before initiating a secured session. In particular, the application on the client initiating the secured communication session, such as an Internet browser, is typically installed with a public key ring including public keys for various well known Certification Authorities that allow the client to verify server certificates issued by these Certification Authorities.

Typically a Certification Authority verifies a subscriber (also known as a requester) before a secure certificate is issued. The verification may include checking the person's identity, address, telephone number, email address, ownership of a domain name, etc. Companies and organizations may be verified by checking if they are properly registered with the appropriate governmental agencies. A Certification Authority may access various databases to verify a person or organization, make phone calls to verify telephone numbers, send email messages to verify email addresses, request copies of person's ID or registration documents for companies and organizations, etc.

A Certification Authority may issue various levels (types) of secure certificates. The secure certificate level typically indicates the rigorousness with which the subscriber was verified.

These techniques for determining the trustworthiness of certain Internet traffic tend to operate at the domain name level. Accordingly, in the case of spam, certain domain names may become associated with spam-type communications and may, therefore, become blacklisted domain names. That black listing can then be used by other entities to determine whether in-bound communications from that domain name are likely to be spam. Unfortunately, even after the sale and transfer of ownership of a domain name, those reputations tend to stay intact and remain associated with the domain name. As such, if a potential purchaser is unaware of the reputation of a particular domain name, there is some risk that the purchaser may purchase the domain name (for example, for use by their business) only to discover that emails sent from the domain name will not be accepted by any other service provider, rendering the domain name essentially worthless.

DETAILED DESCRIPTION AND PREFERRED EMBODIMENT

Figure 1:
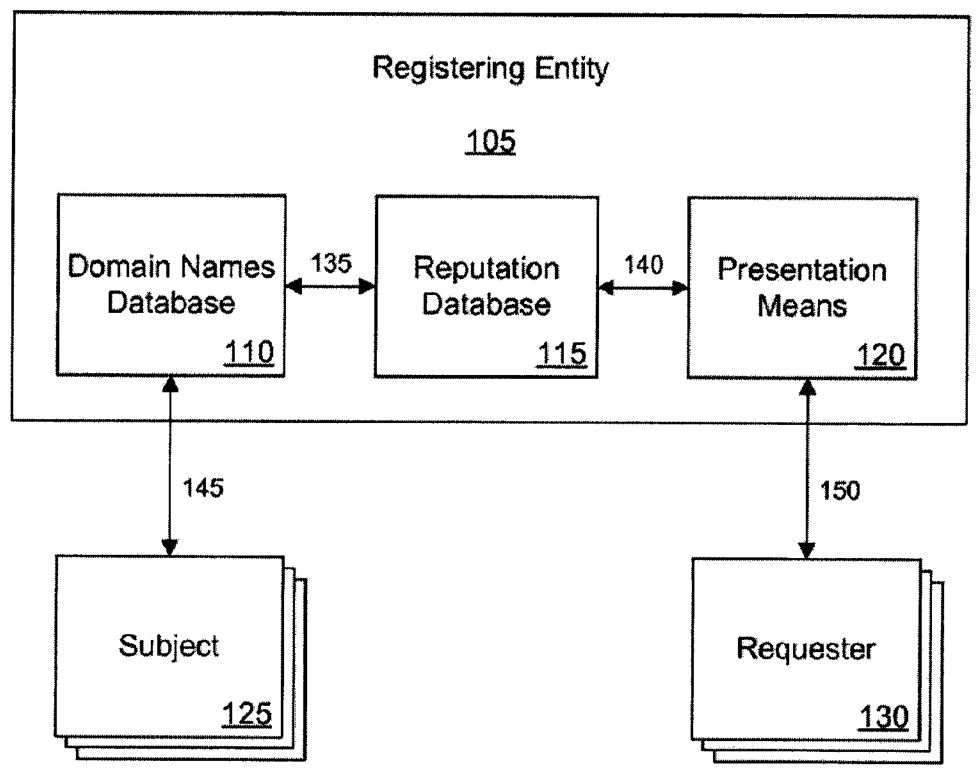
FIG. 1 is a block diagram illustrating an embodiment of the system of the present invention.

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

For the purposes of this application Registering Entity may include one or more domain name Registries, and/or one or more domain name Registrars, and/or one or more domain name Resellers.

Some embodiments of the present invention utilize the unique position of a Registering Entity on the Internet. For example, the Registrar has access to the domain name billing information and can determine who the purchaser of the domain is. The contact information in the domain name WHOIS records is provided by the registrant and is not always reliable. In this case, the Registrar may rely on the billing information. Further, the registrant may choose private registration and the registrant's WHOIS records will be hidden to the public. Nevertheless, the Registrar still has access to the registrant's private registration records. Typically, the Registering Entity has access to forwarding, masking, and DNS records of the domain name, thus if reputation values are determined for one of the domain names, those reputation values may be associated with all the domain names connected through forwarding, masking, or DNS records. Further, the Registering Entity may change WHOIS records; this allows the Registering Entity to save domain name related reputation information into the WHOIS records. If the Registering Entity is a hosting provider for the domain name, the Registering Entity may save domain name related reputation information into the DNS records.

The WHOIS data may be maintained by a Registry, a Registrar, and/or another party. "Thin" Registries store limited amount of information about a domain name; typically, it includes: "Domain Name", "Registrar", "Whois Server", "Referral URL", "Name Server", "Status", "Updated Date", "Creation Date", "Expiration Date", etc. "Thick" Registries in addition store Registrant, Administrative, Technical, and Billing contact information. Registrars usually store detailed information about the domain names registered through them. Even though the WHOIS is public records, many Registries and Registrars limit access to the WHOIS data by automated solutions (e.g. computer programs, scripts, "crawlers," etc.). This prevents copying substantial parts of the WHOIS database and potential use of this data for unsolicited email campaigns. Typically, the Registering Entity may avoid such limitations. Additionally, for the domain names registered through the Registrar, the Registrar has access to the domain name registrations, renewals, transfers, expirations, etc. in real time.

For the purposes of this application domain name related reputation data may include one or more values, ratings, or scores per a domain name. The data may further include links or references to the locations (typically on the network) where such values, ratings, or scores may be found.

Referring to FIG. 1, an embodiment of a system of the present invention includes a Registering Entity 105, a Domain Names Database 110, a Reputation Database 115, a Presentation Means 120, a Subject 125, and a Requester 130. The Registering Entity 105 may be a domain name Registry, a Registrar of domain names, or a Reseller of a Registrar. The Registering Entity 105 may be an accredited ICANN (Internet Corporation for Assigned Names and Numbers) Registry or Registrar. Examples of ICANN-accredited Registrars include GoDaddy.com, Wild West Domains, etc. The Registering Entity 105 maintains the Domain Names Database 110. The Domain Names Database 110 contains one or more domain names registered through or with the Registering Entity 105 or registered through or with another party. The Subject 125 is a person or an entity associated with one or more domain names registered through the Registering Entity 105 (link 145).

The Subject 125 may be a client of the Registering Entity 105, a purchaser of products or services provided by the Registering Entity 105, a user of the products or services provided by the Registering Entity 105 (e.g. email account users), a registrant of one or more domain names registered through the Registering Entity 105, a person or entity on record with the Registering Entity 105 (e.g. billing records, private registration records, etc.), a person or entity appearing in the WHOIS records for one or more domain names registered through the Registering Entity 105 or any combination thereof. The system may include one or more Subjects. The system may also include one or more Registering Entities; for simplification purposes the system of FIG. 1 is described as having one Registering Entity.

The products or services provided by the Registering Entity 105 may include registering a domain name, providing an email service (account), hosting service, issuing a digital certificate, computer software, website designing tools and/or services, reputation tracking service or any combination thereof.

The Reputation Database 115 stores domain name related reputation data. There may be multiple records in the Reputation Database 115 for a single domain name from the Domain Names Database 110 (link 135). The Reputation Database 115 preferably would be maintained by the Registering Entity 105, but could be maintained by a third party or a combination of entities, each storing portions of the Reputation Database 115. The Reputation Database 115 may store reputation records for various categories associated with a domain name. Such categories may include email practices, website content, privacy policies and practices, fraudulent activities, complaints, digital certificates associated with the domain name, an overall reputation or any combination thereof. The overall reputation may be calculated from other reputation records using the sum, average, median, minimum, maximum, or any other formula. The reputation data may be tracked on a person or an entity, a domain name, a URL associated with the domain name, an email address or any combination thereof.

The Reputation Database 115 may hold data on the amount of spam that originated from a domain name email accounts (per week, per month, per year, total, etc.), number of complaints (about spam, about phishing, about other fraudulent activities), or website content (illegal drugs, alcohol, tobacco, sex, pornography, nudity, or any other form of adult content, profanity, violence, intolerance, hate, racism, militant groups, extremists, Satanism, witchcraft, gambling, casino, spam, MLM, pyramid schemes, fraud, or any other illegal or questionable activity, etc.). The values in the reputation data may be numeric ratings or values out of a predetermined set of discrete values. Examples of sets of discrete values include: Yes-No, Bad-Fair-Good-Excellent, etc.

The Reputation Database 115 may hold the dates when the domain name was first or last registered or another value indicating the length of time the domain name has been registered. The longer domain name has been registered, the higher the reputation of the domain name may be.

The reputation values associated with a domain name itself, a domain name registrant (as appearing in WHOIS records), and a domain name purchaser (a person or entity billed) may differ. For example, the domain name purchaser may purchase domain names A, B, and C. The domain name registrant may be the same for domain names A and B, and different for C. Domain name A may have an "Under Construction" page, domain B may be used for an adult content website and domain C may be used for sending out spam. Even though the reputation ratings for domain name A itself would not indicate adult content or spam, the ratings for the purchaser of the domain name A, may so indicate. Similarly, the reputation ratings of the registrant of the domain name A may indicate adult content, because domain name A has the same registrant as domain name B.

The domain name registrant reputation values may be calculated as minimum, maximum, average, median, sum, or any other formula from some or all domain names with the same registrant. Similarly, the domain name purchaser reputation values may be calculated as minimum, maximum, average, median, sum, or any other formula from some or all domain names purchased by the purchaser. In effect the reputation associated with the Subjects 125 (registrants, owners, clients, etc.) may cross multiple domain names.

The Reputation Database 115 may obtain various reputation data from other reputation services, such as SENDERBASE.ORG, Bonded Sender Program, SPAMCOP, "societies" of trusted users, black and white domain/IP/email lists, CLOUDMARK, VERISIGN Verified Domains List, TRUSTe, etc. The variety of reputation data may aid in making better decisions by the Requester 130.

Besides providing "raw" data in the Reputation Database 115 for the Requester 130 to make decisions, the Registering Entity 105 may provide suggestions or recommendations if a particular domain name, URL, email address, etc. should be trusted, i.e. whitelisting and/or blacklisting domain name, URL, email address, etc.

The domain name related reputation data the Reputation Database 115 may be digitally signed for authenticity. The data may be signed with a digital certificate by the Registering Entity 105 or by another trusted party. For the purposes of this disclosure terms "digital certificate" and "secure certificate" are equivalents and used interchangeably.

The Registering Entity 105 may start tracking domain name related reputation voluntarily or after a request from the Subject 125. The Registering Entity 105 may offer the reputation tracking as an additional service to the Registering Entity's clients.

The Requester 130 may be a person, an entity, or a technological means, such as a computer software, a website, a web service, etc. The system may include one or more Requesters. The data from the Reputation Database 115 may be provided to the Requester 130 via the Presentation Means 120 (links 140 and 150).

The Presentation Means 120 are means for presenting the data and may be maintained by the Registering Entity 105 and may include DNS records, WHOIS records, a website, a web service, a whitelist, a blacklist, a computer software, an API-based solution or protocol, or any combination thereof. For example, the Registering Entity 105 may post some reputation values in the domain name DNS or WHOIS records or post into DNS or WHOIS a URL link to the location on the network (e.g. Internet website) where the reputation data may be found.

The domain name related reputation data obtainable through the Presentation Means 120 may be digitally signed for authenticity. The data may be signed with a digital certificate (or secure certificate) by the Registering Entity 105, the Presentation Means 120, or by another trusted party. For example, the reputation data in WHOIS records may be digitally signed by the Registering Entity 105.

A digital (secure) certificate may serve as the Presentation Means 120. The certificate may contain reputation values (ratings, scores) or one or more URL links, where the reputation values can be found. The reputation values (or links) may be updated every time the certificate is renewed. The certificate may be created or signed by the Registering Entity 105 or created or signed by a certification authority. A digital (secure) certificate may be an SSL certificate.

In another embodiment of the invention the partners of the Registering Entity 105 may have access to the Reputation Database 115. The Presentation Means 120 in this embodiment may include a system that periodically feeds reputation data to the partners. The reputation data may be in XML (eXtensible Markup Language), character-delimited (e.g. CSV (Comma-Separated Values) or TSV (Tab Separated Values)), fixed length, or other formats.

The system of the present invention provides a framework, centralized around a Registering Entity, for accessing the reputation data. Any Internet or email user (or automated solution) may find domain name related reputation data through a Registering Entity where the domain name was registered or in domain name WHOIS records as opposed to a variety of disconnected solutions that may exist presently. If a domain name is transferred from one Registering Entity to another, the reputation data may be transferred from one Registering Entity to another as well.

Figure 12:
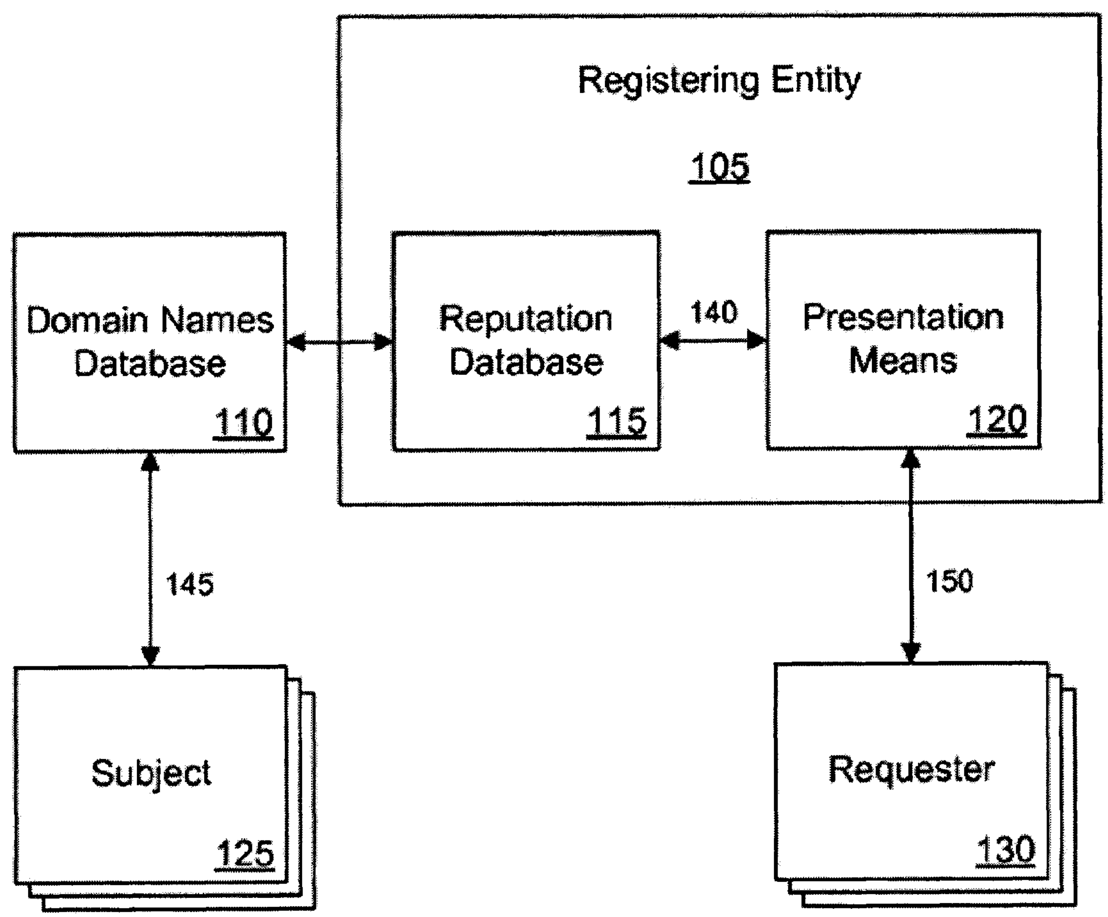
FIG. 12-14 are block diagrams illustrating an embodiment of the reputation system of the present invention.
Figure 14:
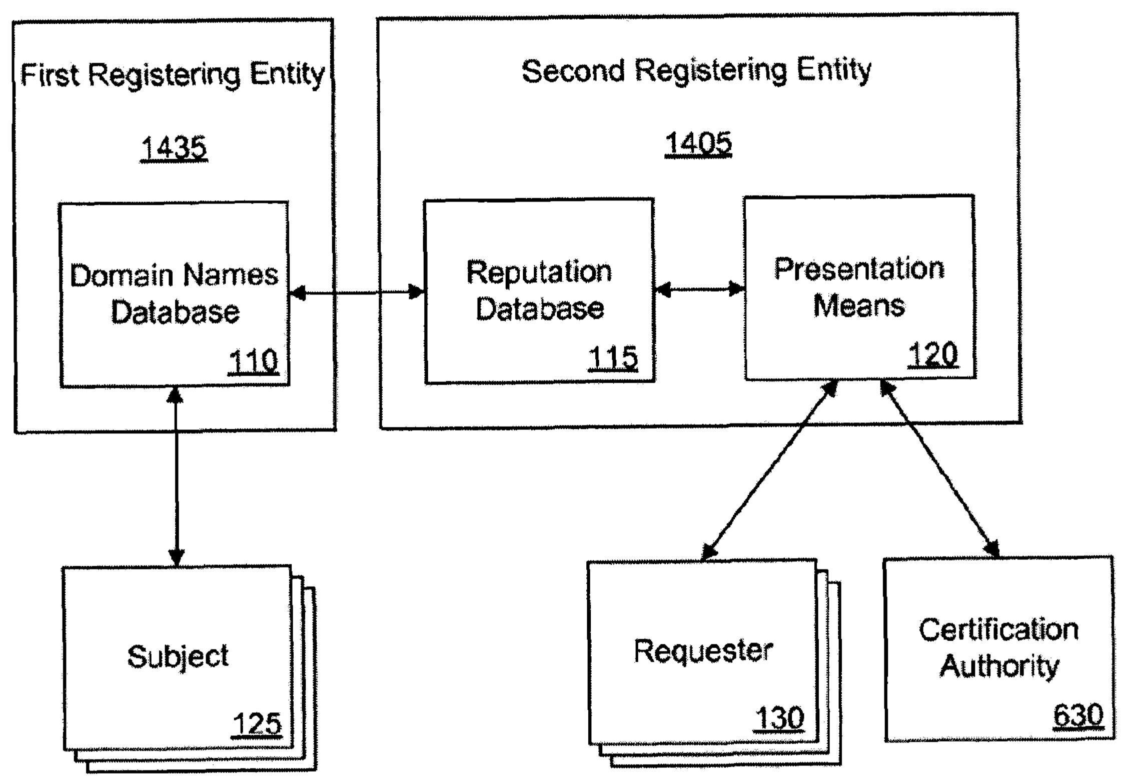

Alternatively, as shown in FIGS. 12 and 14, the Domain Names Database 110 may be maintained by an entity other than the Registering Entity 105, e.g., by a third party registering entity (a First Registering Entity 1435). The Domain Names Database 110 contains one or more domain names registered through or with the Registering Entity 105 or registered through or with another party.

Figure 2:
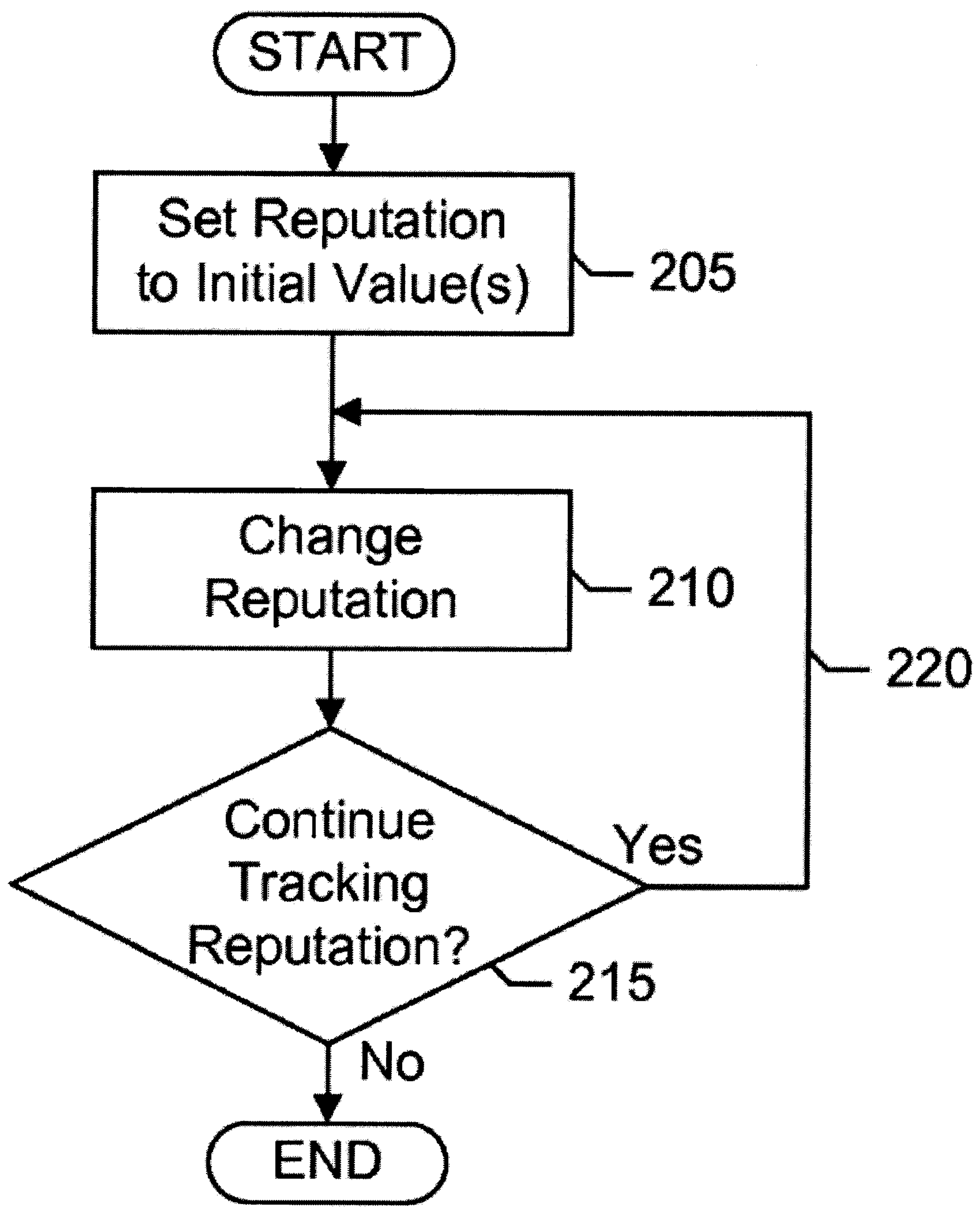
FIG. 2 is a flowchart illustrating a method of the present invention for tracking domain name related reputation.

FIG. 2 depicts a method in accordance with the teachings of the present invention for tracking domain name related reputation. A Registering Entity may set one or more values in domain name related reputation data to initial values (Step 205). The Registering Entity may change one or more values in domain name related reputation data (Step 210). If continuous tracking of the domain name related reputation is desired (Step 215), then Steps 210 and 215 may be repeated (Step 220).

The initial values may be set to null, zero, or any other value. The values may be on various scales, for example from 0 to 100, from 0 to infinity, or from −100 to 100, where 0 may represent a domain name with no reputation, etc. The Registering Entity may develop a schedule of points to be awarded for various events associated with the domain name.

For example, if the Registering Entity receives a legitimate complaint about a spam email message originating from a domain name, the email practices reputation rating (score, value) of the domain name and the email address reputation rating may be reduced by one. If the domain name exists for a year with no complaints, the domain name's overall reputation rating may be raised by 10 points. If the Registering Entity validates the domain name registrant contact information, the overall reputation rating may be raised by 20 points, etc. Additional points may be awarded if the domain name is assigned an SSL certificate issued by a Certification Authority. The rating may be reduced if illegal content is present on the domain name website.

If the domain name is transferred from one Registering Entity to another, if the registrant was changed, if ownership of the domain name was changed, or if the domain name expires, the ratings may be changed (e.g. reset to their initial values). Changes in the domain name registration information (contact or DNS) may trigger a change of the reputation ratings as well. Optionally, the Registering Entity may provide historical values of the reputation ratings.

Figure 5:
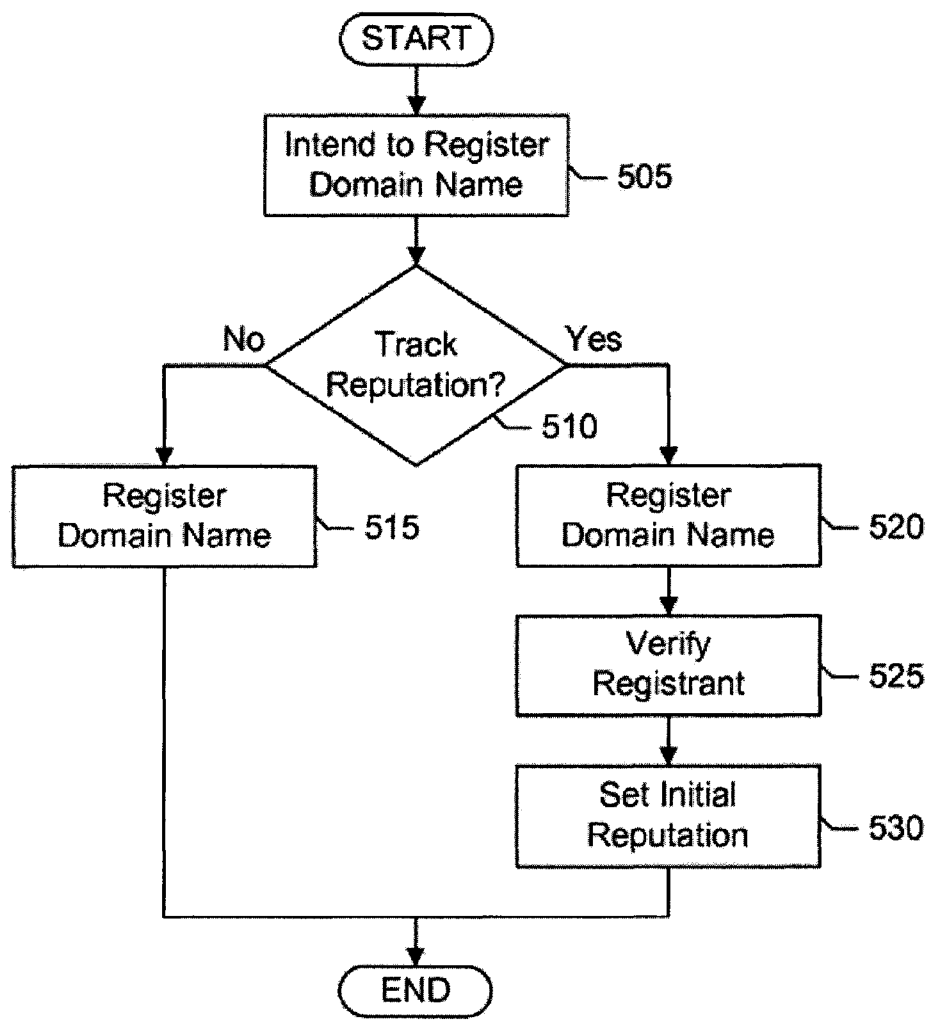
FIG. 5 is a flowchart illustrating a method of the present invention for initiating tracking of domain name related reputation at the point of sale of the domain name.

In another embodiment, referring to FIG. 5, domain name related reputation may be tracked from the point when the domain name is getting registered or renewed (point of sale). A registrant, who intends to register a domain name, may visit a Registering Entity's website (Step 505). The registrant is a person or entity, who registers the domain name; it may not be necessarily a person or entity, which appears in the WHOIS records. A Registering Entity may offer the registrant a reputation tracking service (Step 510). The reputation tracking service may be free of charge for the registrant or may be a paid service. If the registrant does not want the reputation tracking service, the Registering Entity will register the domain name (Step 515). If the registrant opts for the reputation tracking service, the Registering Entity will register the domain name (Step 520), may verify the registrant (Step 525), and then set initial reputation values in reputation data (Step 530).

Figure 22:
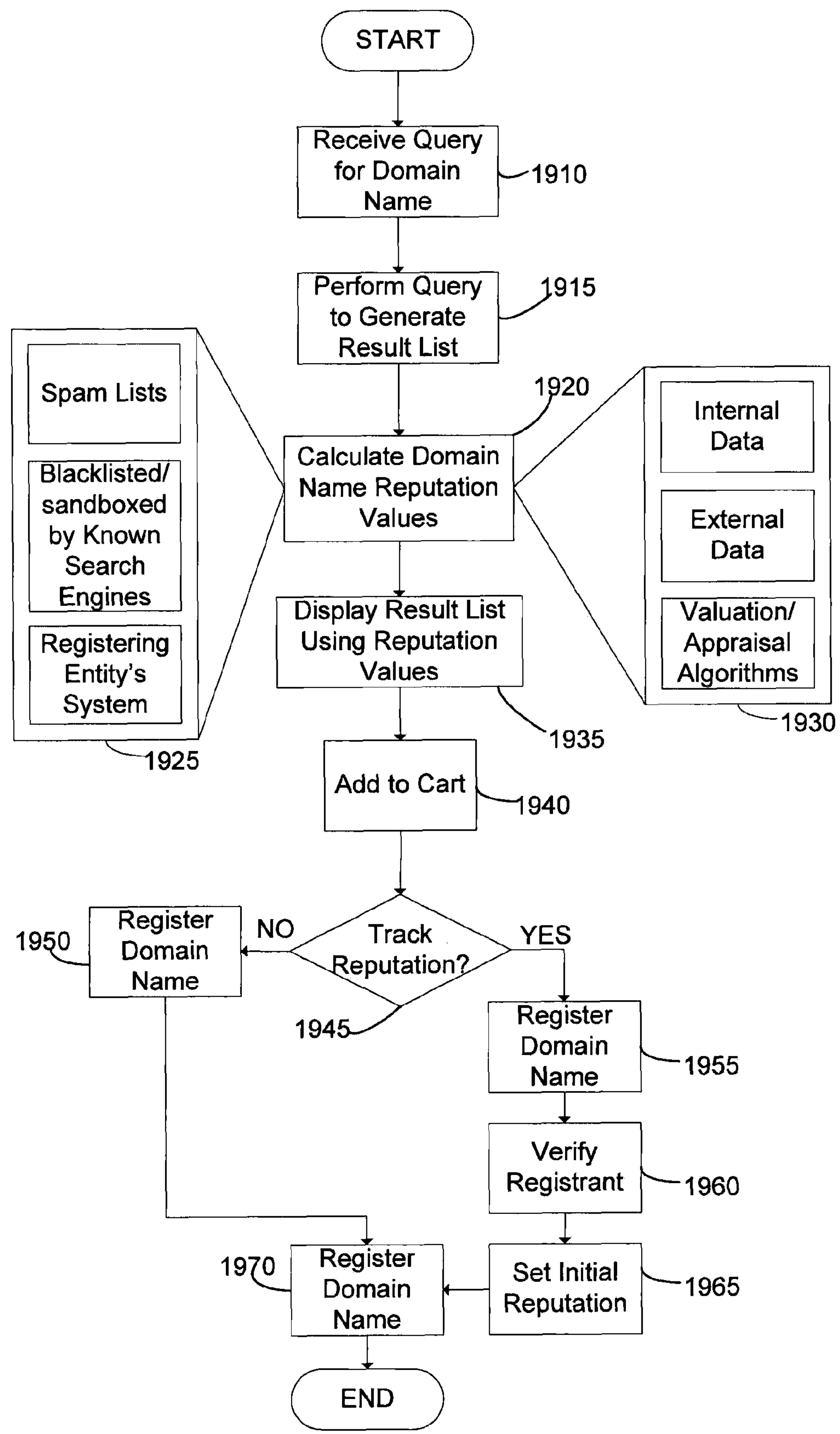
FIG. 22 is a flowchart illustrating a method for calculating the domain name reputation value and displaying domain names in a result listing based on the domain name reputation value.

In yet another embodiment, referring to FIG. 22, domain name related reputation data may be utilized at the time a domain name is searched for as part of a domain name acquisition process. The domain name may be newly registered, renewed (point of sale), or purchased in an aftermarket sale. In the present disclosure, purchasing a domain name may refer to entering into a registration or lease for a domain name in exchange for payment. The payment may consist of a monetary amount or any other exchange of value, such as the provision of services or exchange of domain name leases.

A requester, such as a registrant, who intends to register a domain name, may visit a Registering Entity's website. The registrant is a person or entity, who wishes to search for and register a domain name with the Registering Entity. The registrant may be any individual or entity having access to the network that may wish to research potential domain names for registration. The registrant may issue a request including a domain name query (Step 1910) to the Registering Entity's website in order to search for candidate domain names. The request may comprise any electronic request transmitted to the Registering Entity's website including, but not limited to, a Hyper Text Transfer Protocol (HTTP) request, email message, and/or Short Message Service (SMS) message (i.e., text message). The request may comprise any combination of data containing information relating to a domain name, such as the name of a domain name, or keywords or other data (e.g., images, audio, video, other multimedia, and the like) that may relate to a potential domain name or that can be analyzed or otherwise used to identify one or more domain names relevant to the query. As non-limiting examples, the request may comprise an HTTP request transmitted to the Registering Entity's website.

Figure 23:
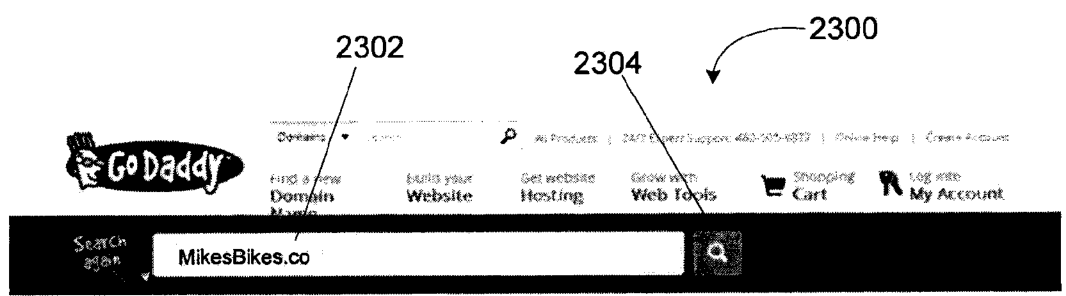
FIG. 23 is a screenshot showing an example user interface by which a registrant can initiate a search for a domain name and view a result listing in accordance with the present invention.

To illustrate, FIG. 23 is a screenshot showing an example user interface 2300 by which the registrant can initiate a search for a domain name in accordance with step 1910 of FIG. 22. Referring to FIG. 23, the registrant can enter the name of the desired domain (e.g., "MikesBikes.com") or other search terms or keywords that may be related to a desired domain name into search box 2302. Then, after the query has been entered into search box 2302, the registrant can activate button 2304 to perform the query.

Returning to FIG. 22, once the request is received (Step 1910), the query is analyzed and a number of candidate domain names are generated in a result listing using the query (Step 1915). If the query included a specific domain name, the result listing may include that specific domain name and, optionally, a number of alternative domain names. If, however, the query included a number of search terms (or other data), rather than a specific domain name, the result listing may contain a number of candidate domain names that are relevant to the query. In some implementations, the result listing may include only a single candidate domain name.

Having generated a result listing of candidate domain names, domain name reputation values (e.g., ratings, scores) can be calculated (Step 1920) for each domain name in the result list.

To calculate the reputation ratings, reputation data associated with each domain name in the result list can be retrieved from one or more systems or data sources (e.g., systems 1925 and 1930 of FIG. 22).

For example, reputation data for each domain name may be retrieved from Reputation Database 115 (see FIG. 1). Reputation data may also be retrieved from a number of third party systems, such as those that monitor domain names for inappropriate activities, such as the sending of spam or hosting of viruses. In addition to reputation data, other information relating to each domain name may be collected for a number of sources, as described below. All of this information can then be combined to determine a reputation rating for each candidate domain name in the result listing.

In some cases, the reputation data may lower the domain name reputation value of a particular domain name, and thereby reduce the value of the domain name.

For example, if a particular domain name is associated with the sending of spam, hosting of viruses, or other inappropriate activities that cause a particular domain name to be untrustworthy, the domain name may receive a relatively poor reputation rating. Example systems that may be used to determine whether a reputation rating for a particular domain name should be lowered or reduced include, but are not limited to, whether the domain name is found in known spam lists (e.g., Spamhaus.com), domain names blacklisted or sandboxed by known search engines (e.g., Google.com), and the Registering Entity's own web pages, customer records, email records, and other systems.

If, for example, the domain name or keywords (e.g., "MikesBikes.com") received by the query (Step 1910) is found on a known spam list, the domain name reputation value may be lowered because this may severely limit, if not entirely block, the registrant's ability to use the domain name to send email, for example.

If, for example, the domain name (e.g., "MikesBikes.com") is determined to be blacklisted or sandboxed by a known search engine as a result of the actions of the previous domain name owner, for example, the domain name reputation value may be lowered since this may limit or block the registrant's ability to get ranked favorably in the search engine. In addition, if the domain name is found on the Registering Entity's system as exhibiting "abusive" behavior (e.g., counterfeit sales) and/or being blocked by the Registering Entity's system, the domain name reputation value may be lowered.

Additionally, each domain name in the result list may be compared against several systems that may, for example, increase the domain name reputation value in order to generate the domain name reputation value (Step 1920). The systems that each domain name is compared against can include, but are not limited to, internal data of the Registering Entity, external data (e.g., Verisign data), and valuation/appraisal algorithms of the Registering Entity.

For example, if the domain name or keywords (e.g., "MikesBikes.com") received by the query (Step 1910) is found in the Registering Entity's internal data, for example, previous traffic data, previous hosting data and DNS data can be obtained to determine if the searched domain name or keywords will perform well if the registrant decides to purchase the domain name, thereby increasing the domain name reputation value. Additionally, if the domain name or keywords (e.g., "MikesBikes.com") received by the query (Step 1910) is found in external data (e.g., Verisign data), information such as the number of DNS requests for the domain name, previous length of registration for dropped domain names, alternative TLDs that are already registered with the same domain name, and the quantity of TLDs that are already registered with the same domain name may be obtained and increase the domain name reputation value. Lastly, if valuation/appraisal algorithms of the Registering Entity are used on the domain name or keywords (e.g., "MikesBikes.com") received by the query (Step 1910), information regarding which domain names that are already registered with the Registering Entity and are included in the result listing would have a higher domain name reputation value for use by a registrant who is a small-medium business customer, for example.

After identifying relevant reputation data that may be collected from a number of external sources for the candidate domain names of the result listing, the reputation data can be combined into a single reputation rating for each candidate domain name.

When the reputation data collected from each external source includes only numeric ratings, that information can be normalized to reduce each datum in the reputation data to a canonical form. Once normalized, the reputation data can then be averaged to determine an overall numeric reputation rating for each of the candidate domain names. This may include the additional step of providing different weightings for the reputation data depending, for example, upon the source of the reputation data, the age of the reputation data, or any other attribute of the reputation data.

For example, a domain name that has been previously registered for a long time (e.g., greater than 10 years) and has no history of sending spam or unsolicited emails or other abuse may receive a relatively high reputation rating. In contrast, a domain name that has been previously registered for a short period of time and has a history of abuse will be given a low reputation rating. The length of the prior registration of a particular domain name may be determined by analyzing the registration records for the domain name, if available. If not, archive services (e.g., archive.org), and the like may be used to determine the prior registration history of a particular domain name.

In some cases, the TLD of a particular domain name may influence its reputation rating. For example, the TLD .info may, in some cases, be associated with the sending of unsolicited emails. In that case, domain names having a TLD of .info may receive a lower reputation rating. Similar rules may apply to other TLDs to either raise or lower the reputation rating of a particular domain name.

In other cases, the reputation data may be combined according to an algorithm that includes a number of logic statements. For example, if it is determined that a particular domain name is listed in a spam blacklist, that domain name may always be allocated the lowest reputation rating possible.

Alternatively, if the domain name has been issue a certified security certificate, the domain name may always be given a maximum reputation rating, for example, even if it has been previously registered for only a short period of time. Similarly, domain names that were previously registered to companies rather than individuals may receive higher reputation ratings than domain names that were previously registered to individuals.

Because there may be other, unforeseen factors that can influence the reputation rating of a particular domain name, the present system, although contemplating the automatic calculation of a reputation rating, may also allow a system administrator to modify or otherwise adjust a reputation rating for a particular domain name.

In some implementations, if the reputation rating of a particular domain name is determined to be lower than a particular threshold, the domain name may be excluded from the listing of candidate domain names entirely.

Figure 24:
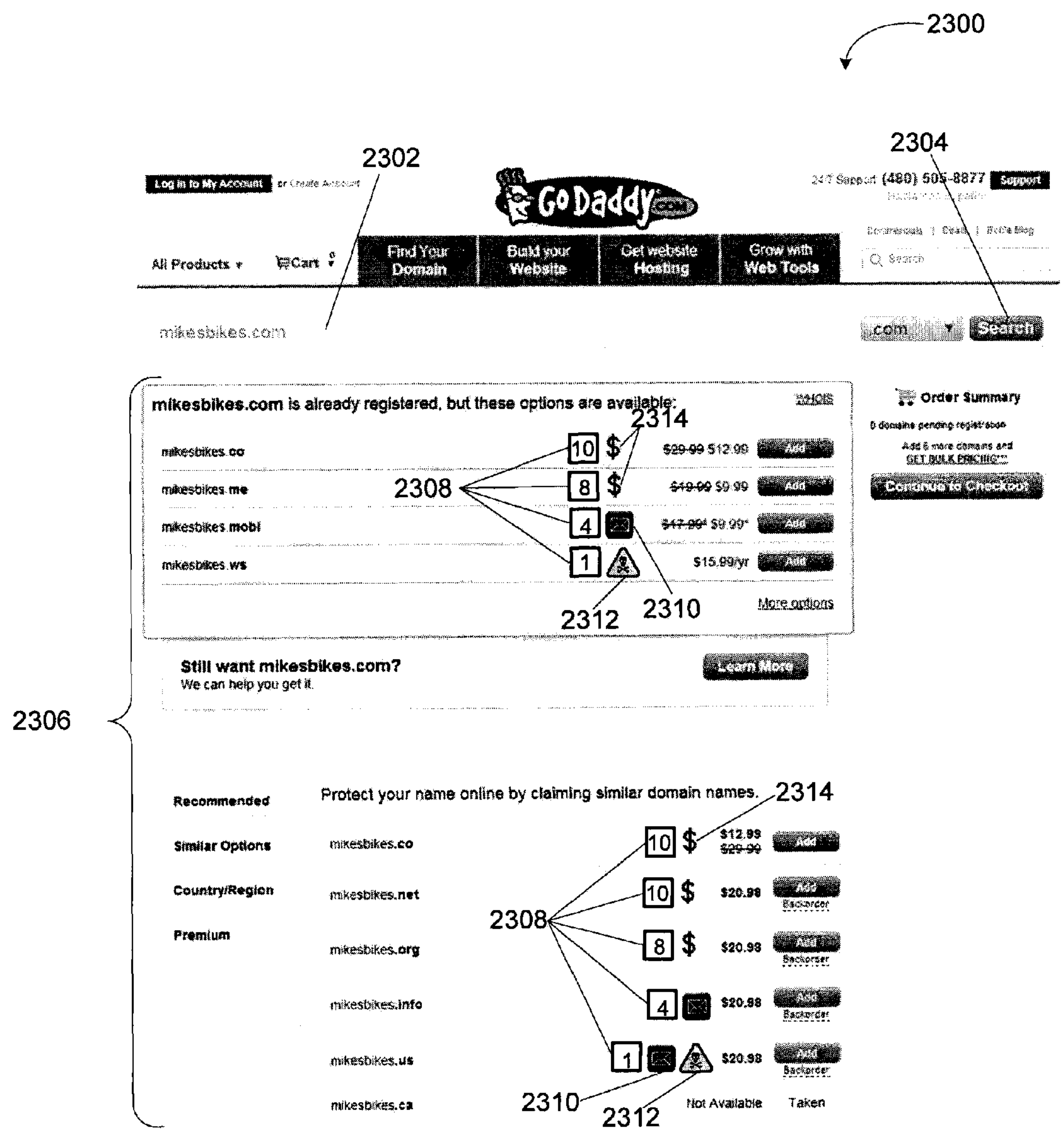
FIG. 24 is a screenshot showing the example user interface by which the registrant can initiate a search for a domain name and can view the result listing including numerical score, email, spam and currency icons indicating the reputation of each domain name.

Referring now to FIG. 24, once calculated, the Registering Entity's website may utilize the reputation ratings of each of the candidate domain names when displaying the result list 2306 to the user (Step 1935). For example, the result list 2306 displayed to the user (Step 1935) may display domain names having high domain name reputation values at the top of the result list 2306 and domain names having low domain name reputation values near the bottom of the result list 2306. In general, domain names having higher reputation values will have preferred placement in the result list over domain names with lower reputation values. The preferred placement may comprise any location on the website that may be more likely to attract the attention of a user than another location. The preferred placement location, as non-limiting examples, may be determined by human factors, usability, or similar studies, or may be a simple arbitrary or intuitive choice. The preferred placement may comprise a preferred placement within a vertical arrangement of a plurality of domain names, perhaps at the top of a list of a plurality of domains, or simply a higher placement within such a list than the placement of other domain names. The preferred placement may therefore, as non-limiting examples, comprise a top-most, bottom-most, or more centered position in any such vertical list. This concept may also apply to a horizontal arrangement of domain names, wherein perhaps the preferred placement comprises a left-most, right-most, or more centered position. Alternatively or in addition, different font sizes or colors may be utilized to indicate the reputation values for different domain names in the result list 2306.

In other implementations, the normal result list 2306 may be displayed but icons 2308 indicating the reputation rating of each domain name may be displayed in proximity to each of the candidate domain names. For example, the icons 2308 may indicate a numerical score as shown in FIG. 24, or the icons 2308 may indicate a percentage representing the reputation rating of each domain name. The numerical score may be from one to ten, for example, where the numerical score of ten indicates a high reputation rating and a score of one indicates a low reputation rating. Alternatively, the icons 2308 may merely indicate whether the domain name has a positive or a negative reputation rating (e.g., a plus or minus sign) or the icons 2308 may be color coded (e.g., green or red) to indicate a positive or negative reputation rating.

Alternatively, the icons may indicate specific attributes of the domain names. For example, domain names that have a reputation for sending spam email may be depicted next to an email icon 2310, domain names that have a reputation for hosting viruses may be depicted next to a virus icon 2312, and the like. Similarly, domain names that have a reputation for driving lots of traffic may be depicted next to an icon showing a currency symbol 2314 (e.g., a dollar sign). For example, the amount of traffic for the domain name may be determined to exceed a particular threshold indicating that the domain name experiences a relatively high amount of traffic. The threshold may be a fixed traffic amount or may be calculated for each candidate domain name, for example, by analyzing parked page data for other, similar, domain names to determine an average traffic amounts over a number of similar domain names. The traffic volume for a particular domain name can be determined by analyzing DNS and/or WHOIS requests for the domain name. When analyzing WHOIS data, one metric for scoring the domain name may be: thirty or more WHOIS lookups per month=high rating for the domain name, between 15 and 30 WHOIS lookups per month=good rating, between 5 and 15 WHOIS lookups per month=good rating, and less than 5 WHOIS lookups per month=poor rating. When analyzing web traffic to the domain name, one metric for scoring the domain may be: 300 or more requests per month (e.g., DNS requests for the domain name)=high rating for the domain name, between 30 and 300 requests per month (e.g., DNS requests for the domain name)=good rating, between 10 and 30 requests per month (e.g., DNS requests for the domain name)=average rating, and less than 10 requests per month (e.g., DNS requests for the domain name)=poor rating. The result list 2306 may be displayed with none of the icons or all of the icons (i.e., icons with numerical score 2308, email icon 2310, virus icon 2312 and current icon 2314), one of the icons, or a combination of one or more of the icons previously described.

With the result list 2306 being displayed from high domain name reputation values to low domain name reputation values, the registrant is presented with a better quality result list of domain names that have the best chance, based on the systems (Steps 1925 and 1930), of being successful.

In some implementations additional factors that are somewhat unrelated to the reputation of a domain name can be combined with the reputation rating and utilized in the manner described above to display the result listing of candidate domain names. For example, the cost of the candidate domain names can be used in conjunction with the reputation rating to determine how the candidate domain names should be displayed on the result listing. For example, given the same reputation rating, cheaper domain names may be listed before more expensive domain names. In some cases, the domain name is compared to a registry of registered trademarks, such as the registry or databases provided by the United States Patent and Trademark Office databases (e.g., Trademark Electronic Search System (TESS), Trademark Status and Document Retrieval System (TSDR), or Trademark Application and Registration Retrieval (TARR) System). If the domain name is determined to be similar to a previously registered trademark, the user may be notified that, if they were to purchase the domain name, there may be trademark concerns. In an alternative embodiment, a determined similarity between the domain name and previously-registered trademarks may reduce the domain name's rating or reputation value.

The registrant may then add one or more of the domain names from the result list to their shopping cart (Step 1940) by pressing a button 2330, as shown in FIG. 24. This step may be accomplished by any method of informing a potential registrant that a domain name may be available for registration. As a non-limiting example, where a request for a domain name is received (Step 1910) via an electronic request (e.g., HTTP request, email message, SMS message, text message), the domain name may be provided for registration via similar electronic communication means, perhaps via a domain name registration web site hosted by a suitably configured computer server. Thus, an HTTP domain name request may be responded to with an HTTP response that provides a webpage listing the domain name for registration, perhaps as a hyperlink.

Once the registrant has added the desired domain name to their shopping cart (Step 1940) the Registering Entity may, in some cases, offer the registrant a reputation tracking service (Step 1945). The reputation tracking service may be free of charge for the registrant or may be a paid service. If the registrant does not want the reputation tracking service, the Registering Entity will register the domain name (Step 1950). If the registrant opts for the reputation tracking service, the Registering Entity will register the domain name (Step 1955), may verify the registrant (Step 1960), and then set initial reputation values in reputation data (Step 1965). Once the registrant has decided to track the reputation (Step 1945) of the domain name, the registrant may click on the domain name and be taken to a domain name registration website to check out (Step 1970) as shown in FIG. 22.

Domain name registration may be accomplished by any domain name registration method known in the art or developed in the future, perhaps via a website-enabled domain name purchase and registration system, such as that described in detail above and/or may be available on GODADDY.COM's website. Alternatively, domain name registration may be accomplished via human to human communication, perhaps via a telephone call or in-person meeting. Domain names may be registered by, as non-limiting examples, any individual or entity including, but not limited to a domain name registry, domain name registrar, hosting provider, and/or software application developer or distributor.

Figure 25:
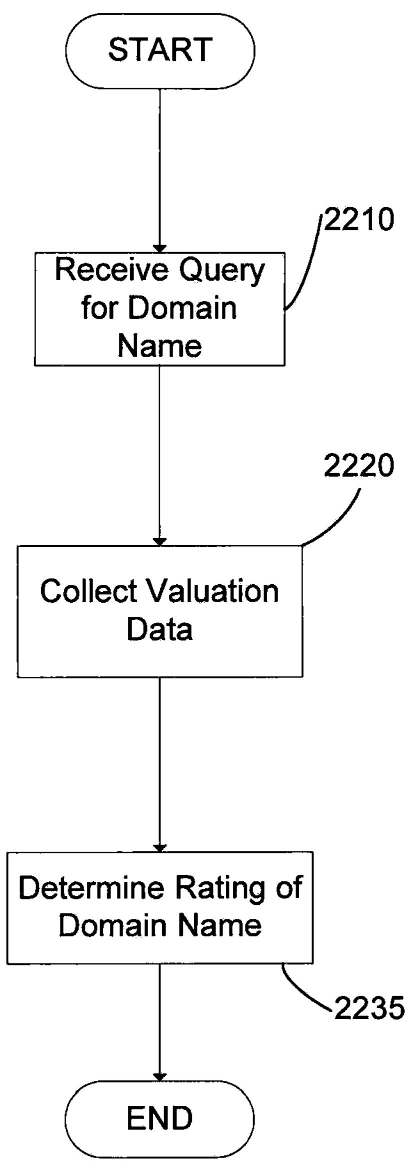
FIG. 25 is a flowchart illustrating a method for calculating a value of a domain name, wherein the value is at least partially determined by a reputation rating of the domain name.

In yet another embodiment, referring to FIG. 25, a method may be used to determine a rating or value for a queried domain name, where the rating or value is at least partially determined by the reputation rating of the domain name. The method illustrated in FIG. 25, may be used, for example, to determine ratings that can be used in controlling how a result listing is displayed in response to a requester's query for a listing of candidate domain names. The method may be performed, for example, by a computer server providing a user interface through which a user can supply a domain name. The computer server can then determine a rating for the domain name that is at least partially determined by a reputation rating of the domain name. The user interface may then be used, once the rating is determined, to display the rating for the user's review. Alternatively, the method may be implemented by a computer server without a user interface. In that case the computer server may provide an application programming interface (API) that may be accessed by other computers to cause the execution of the method. For example, a requesting computer system may execute a suitable API function call to supply the computer server with a domain name and initiate the determination of a rating for the domain name. The computer server can then determine the rating of the domain name and return the rating as an output of the API function call.

In some cases, the method may be utilized in a service to rate a particular domain name that a user may be interested in purchasing. The user may wish to know, for example, whether the domain name has a good or a poor rating before paying money for the domain name. In some cases, the rating may be translated into a monetary value for the domain name. The method may utilize any of the mechanisms or techniques discussed above with respect to FIG. 22 or discussed elsewhere in this disclosure for determining a reputation rating or an overall rating or value for a particular domain name.

In step 2210 a request is issued for a particular domain name. The request may comprise any electronic request transmitted to the Registering Entity's website including, but not limited to, a Hyper Text Transfer Protocol (HTTP) request, email message, and/or Short Message Service (SMS) message (i.e., text message). The request may comprise any combination of data containing information relating to a domain name, such as the name of a domain name, or keywords or other data (e.g., images, audio, video, other multimedia, and the like) that may relate to a potential domain name or that can be analyzed or otherwise used to identify one or more domain names relevant to the query. As non-limiting examples, the request may comprise an HTTP request transmitted to the Registering Entity's website. To illustrate, FIG. 23 is a screenshot showing an example user interface 2300 by which the registrant can initiate a search for a domain name in accordance with step 2210 of FIG. 25.

Returning to FIG. 25, once the request is received (Step 2210), the request is analyzed to identify a domain name and a rating of the domain name is determined. The rating is at least partially determined by a reputation of the domain name.

Accordingly, once the domain name is identified, data is collected from a variety of systems or data sources in step 2220, where the data will ultimately be used to determine a rating of the domain name. For example, the valuation data may include reputation data for the queried domain name. The reputation data may be retrieved from Reputation Database 115 (see FIG. 1). Reputation data may also be retrieved from a number of third party systems, such as those that monitor domain names for inappropriate activities, such as the sending of spam or hosting of viruses. Additional valuation data may include the length of time that the domain name has been previously registered, whether the domain name was previously registered by an individual or a company, how much traffic the domain name sees (e.g., derived from DNS and/or WHOIS records), the number of other registered domain names with the same second level domain but different TLD, whether the domain name is known for the sending of unsolicited message, hosting viruses, or fraudulent behavior, such as the selling of counterfeit goods, whether the domain name is on a watch list for bad behavior, the cost or price of the domain name, the similarity between domain and registered trademarks, and the like.

All of this information can then be combined to determine a rating or value for the queried domain name using the techniques described herein, such as those described in conjunction with the method illustrated in FIG. 22.

For example, if a particular domain name is associated with the sending of spam, hosting of viruses, or other inappropriate activities that cause a particular domain name to be untrustworthy, the domain name may receive a relatively poor reputation rating. This poor reputation rating will then affect the overall rating of the domain name. Example systems that may be used to determine whether a reputation rating for a particular domain name should be lowered or reduced include, but are not limited to, whether the domain name is found in known spam lists (e.g., Spamhaus.com), domain names blacklisted or sandboxed by known search engines (e.g., Google.com), and the Registering Entity's web pages and system.

If, for example, the domain name or keywords (e.g., "MikesBikes.com") received by the query (Step 2210) is found on a known spam list, the domain name reputation value may be lowered because this may severely limit, if not entirely block, the registrant's ability to use the domain name to send email, for example.

If, for example, the domain name (e.g., "Mikes-Bikes.com") is determined to be blacklisted or sandboxed by a known search engine as a result of the actions of the previous domain name owner, for example, the domain name reputation value may be lowered since this may limit or block the registrant's ability to get ranked favorably in the search engine. In addition, if the domain name is found on the Registering Entity's system as exhibiting "abusive" behavior (e.g., counterfeit sales) and/or being blocked by the Registering Entity's system, the value or quality of the domain name reputation may be lowered.

Additionally, the queried domain name in the result list may be compared against several systems that may, for example, increase the domain name's reputation rating, which may, in turn, increase the rating of the domain name (Step 2235). The systems that the domain name is compared against can include, but are not limited to, internal data of the Registering Entity or any third party domain name valuation services, external data (e.g., Verisign data), and valuation/appraisal algorithms of the Registering Entity, as will be discussed in further detail below.

After identifying relevant valuation data, which, as described above, can include reputational data, the valuation data can be combined into a single rating or value for the domain name. The rating for the domain name may be calculated as a minimum, maximum, average, median, sum, or any other formula from some or all of the valuation data collected for the domain name. A representation of the rating of the domain name may then be displayed to the user (e.g., in a similar fashion to that shown in FIG. 24). For example, the rating may be displayed in the form of a score (e.g., from 1 to 100) indicating a quality of the searched-for domain name. Alternatively, icons may be used to indicate with the domain name has a bad, good, or excellent quality rating, where different ranges of numerical rating values are defined as being bad, good, or excellent quality ratings. Additionally, if the domain name was determined to have a reputation, for example, for the sending of spam emails, an icon may be displayed (e.g., an envelope icon) to indicate to the viewer that the domain name has such a reputation. Other icons may include those indicating that the domain is associated with hosting virus, sees a large amount of traffic, and the like.

With the queried domain name displayed in the result list 2306, the registrant is presented with a single domain name rating for the queried domain name.

Verification may include validating information appearing in the WHOIS records or in the private registration records, as well as validating registrant's business records, driver's licenses, or other documents. There may be multiple levels of verification performed. Basic levels may include validating some of the contact information appearing in the WHOIS record or in the private registration records. Advanced levels may include verification of a variety of registrant's documents. More extensive and comprehensive verification levels may result in higher reputation values (assuming the verification was successful).

In yet another embodiment, if the registrant does not opt for the reputation tracking service, the Registering Entity may still create reputation data for the domain name and populate it with some default values.

Figure 15:
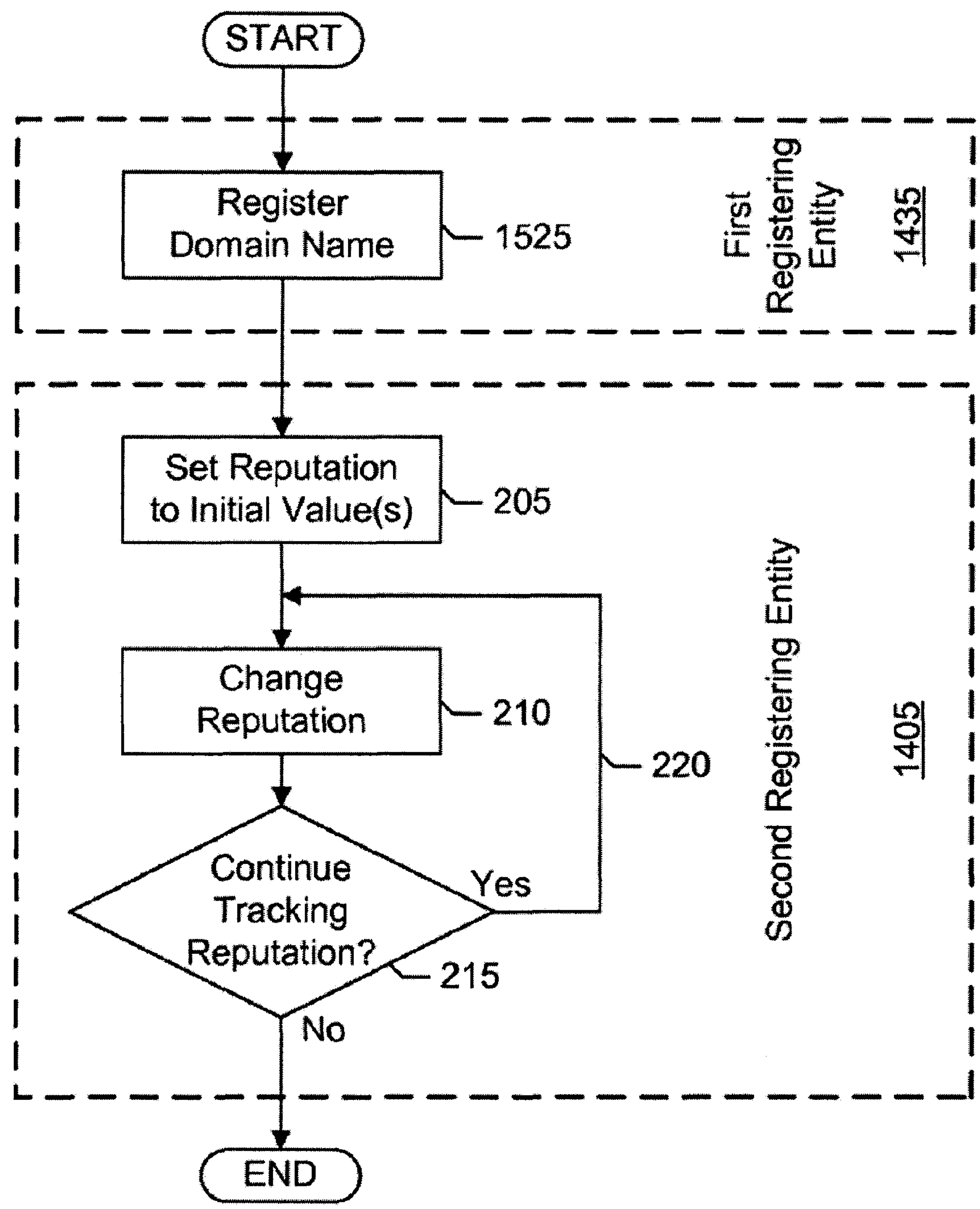
FIG. 15 is a flowchart illustrating a method of the present invention for tracking domain name related reputation.

Alternatively, as shown in FIG. 15, a domain name may be registered (Step 1525) through a First Registering Entity 1435 and reputation may be tracked (Steps 205, 210, 215, and 220) by a Second Registering Entity 1405 (a Trusted Registering Entity).

Figure 3:
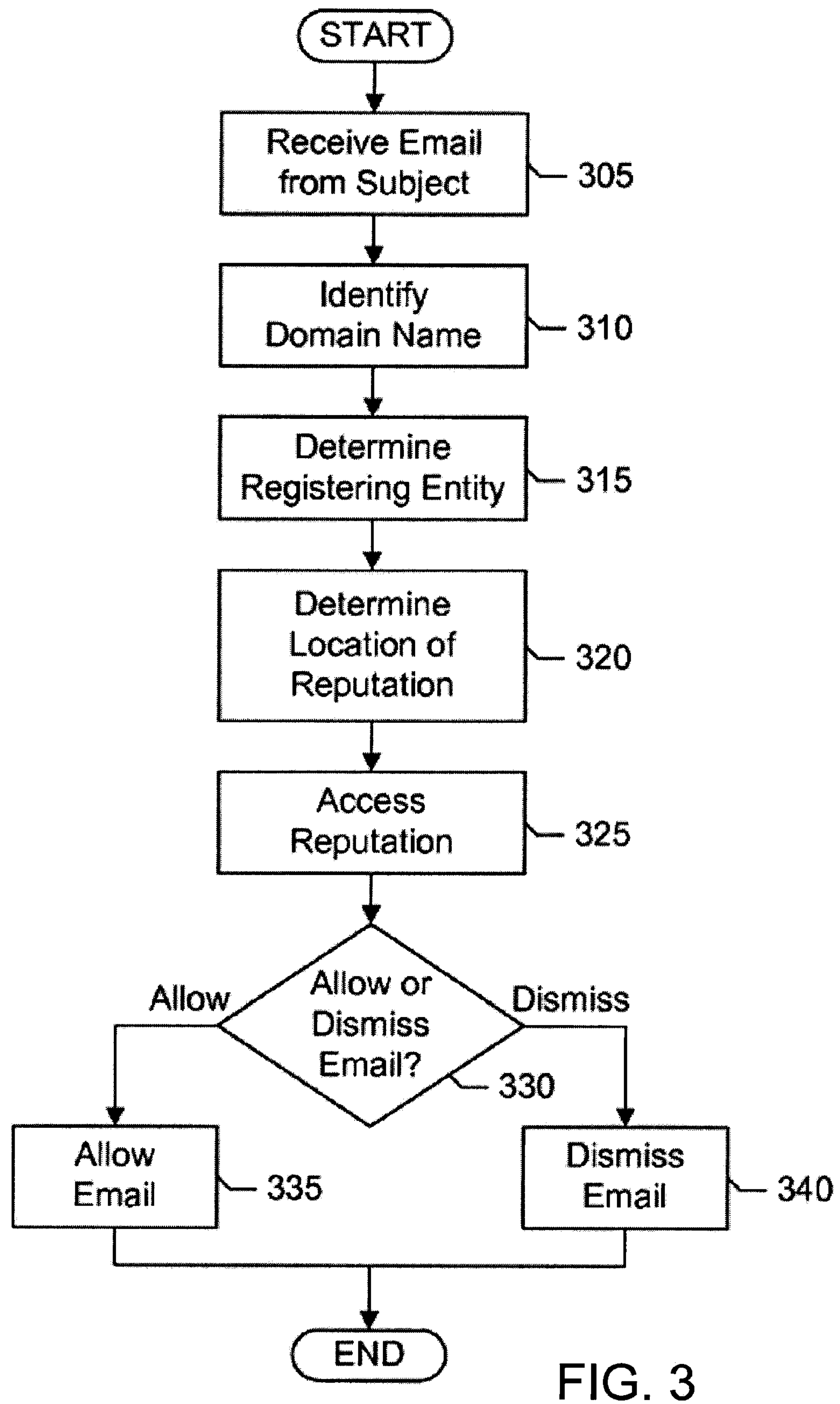
FIG. 3 is a flowchart illustrating a method of the present invention for accessing domain name related reputation after receiving an email message.

FIG. 3 illustrates a method for accessing domain name related reputation data after a Requester receives an email message. The method includes the following steps. A Requester receives an email message (Step 305). The Requester identifies a domain name (Step 310). The Requester determines a Registering Entity of the domain name (Step 315). The Requester determines the location of domain name related reputation data (Step 320). The Requester accesses the domain name related reputation data (Step 325). Based on the domain name related reputation data the Requester decides (determines) whether to allow or dismiss the email message (Step 330). Depending on that decision the Requester either allows the email message (Step 335) or dismisses it (Step 340).

Preferably, the Requester is computer software running in conjunction with an email server or a client email program. In Step 310 the Requester may identify a domain name from an email address of a sender. Additional steps may be taken to ensure that the email address of the sender was not forged (spoofed). If the Registering Entity in Step 315 is a Registrar, then the Registrar may be determined from the Registry's WHOIS records. Referring to Step 320, the location of the domain name related reputation data may be, inter alia, a database, a website, a web service, WHOIS records, DNS records, a digital (secure) certificate, etc. The location of the domain name related reputation data may be a predetermined location (e.g. http://reputation.godaddy.com) or may be provided by a link or reference. The link or reference to the location may be, inter alia, a URL link, a DNS address, an IP address, a computer port or any combination thereof. For example, a URL link to the website where the reputation data is located may be specified in the WHOIS records. If the location of the domain name related reputation data is specified in the Registry's WHOIS records, then Step 315 (determining the Registering Entity) may be omitted. Step 320 (determining the location of reputation data) may include the following sub-steps: determine a location of the Registrar's WHOIS data from the Registry's WHOIS (e.g. whois.godaddy.com) and then obtain a URL to the domain name related reputation data from the Registrar's WHOIS.

The Requester decides (determines) whether the values in the domain name related reputation data are appropriate to allow the email message. The domain name related reputation data may have multiple values (ratings); it is likely that the rating(s) for email practices will be considered by the Requester. If the Requester decides to allow the email message, it may be placed into the user's Inbox. If the email message is not allowed, it may be deleted or placed in a special quarantine mailbox (e.g. "Spam", "Junk mail," "Bulk mail," etc.). Additionally, links to the web pages in the email message may be checked for their domain name related reputation and this information may be used in the decision of whether to allow the email message.

Figure 16:
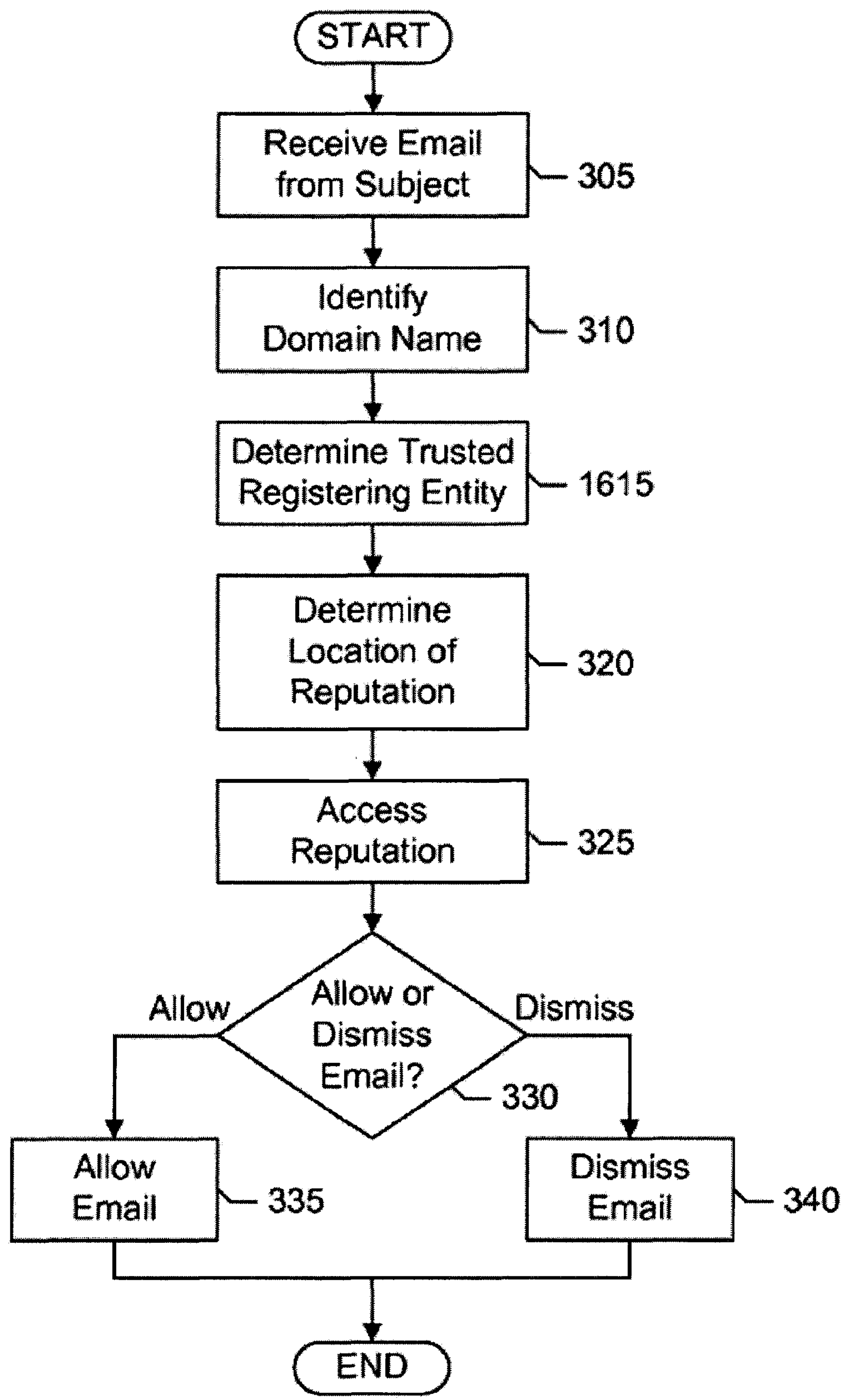
FIG. 16 is a flowchart illustrating a method of the present invention for accessing domain name related reputation after receiving an email message, using Trusted Registering Entity.

Alternatively, as shown in FIG. 16, the Requester may determine a Trusted Registering Entity for the domain name (Step 1615). The Trusted Registering Entity may be different from the Registering Entity with which the domain name is registered. The Trusted Registering Entity may be specified in DNS records, WHOIS records, or in the digital certificate associated with the domain name. Also, the Requester may query a commonly known Trusted Registering Entities to determine if they have reputation information for the domain name.

Figure 4:
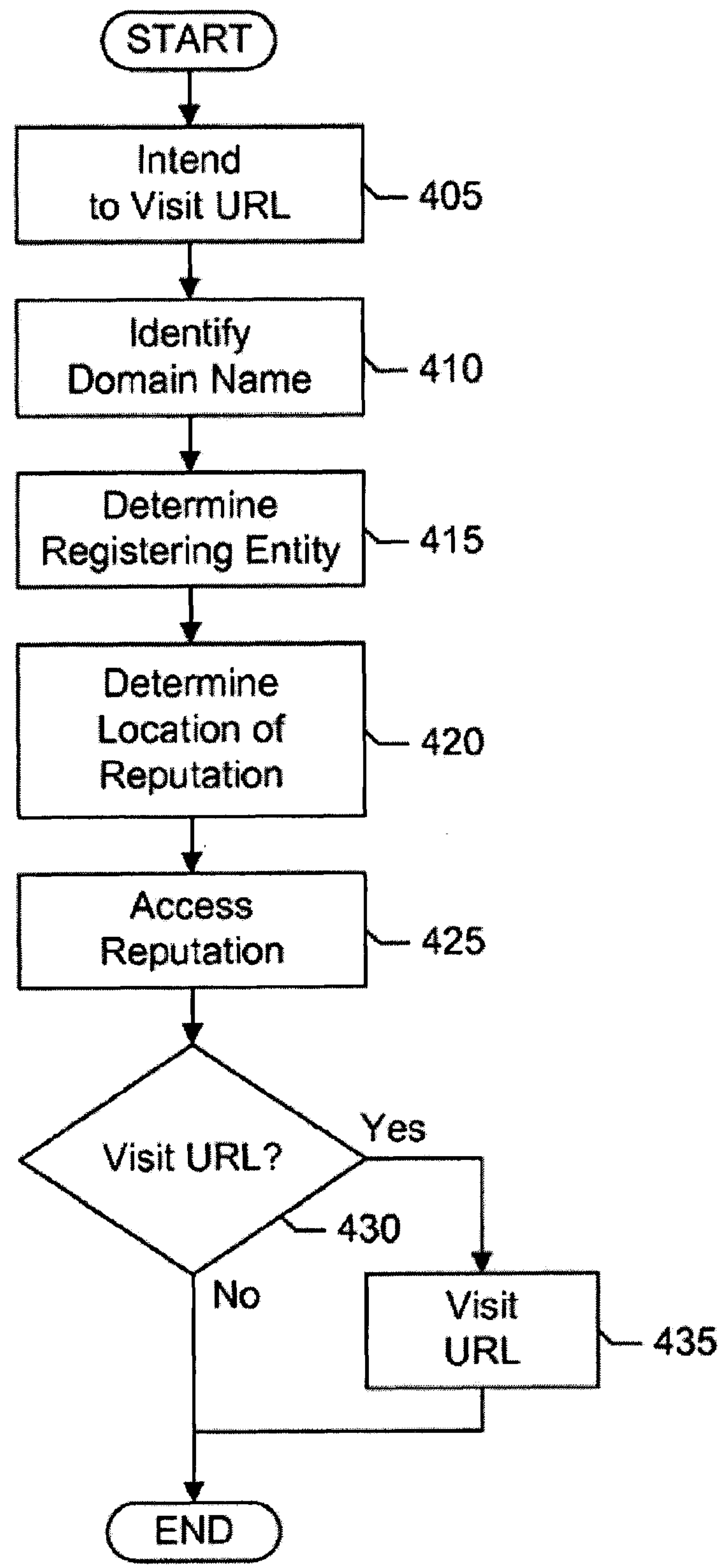
FIG. 4 is a flowchart illustrating a method of the present invention for accessing domain name related reputation before visiting a URL.

Similarly to FIG. 3, the Requester may use domain name related reputation to determine if the Requester should visit a URL link. Referring to FIG. 4, a Requester intends to visit a URL (Step 405). The Requester identifies a domain name from the URL (Step 410). The Requester determines a Registering Entity of the domain name (Step 415). The Requester determines the location of domain name related reputation data (Step 420). The Requester accesses the domain name related reputation data (Step 425). Based on the domain name related reputation data the Requester decides (determines) whether the Requester should visit the URL (Step 430). If the Requester decides to visit the URL, it may do so (Step 435).

In this method the Requester may be computer software working in conjunction with an Internet browser. If the domain name and/or the URL have a low reputation, the webpage located at the URL may be blocked. Alternatively, the computer software may give the user a warning that the domain name and/or the URL have a low reputation. The user may then decide whether to visit the URL.

Figure 17:
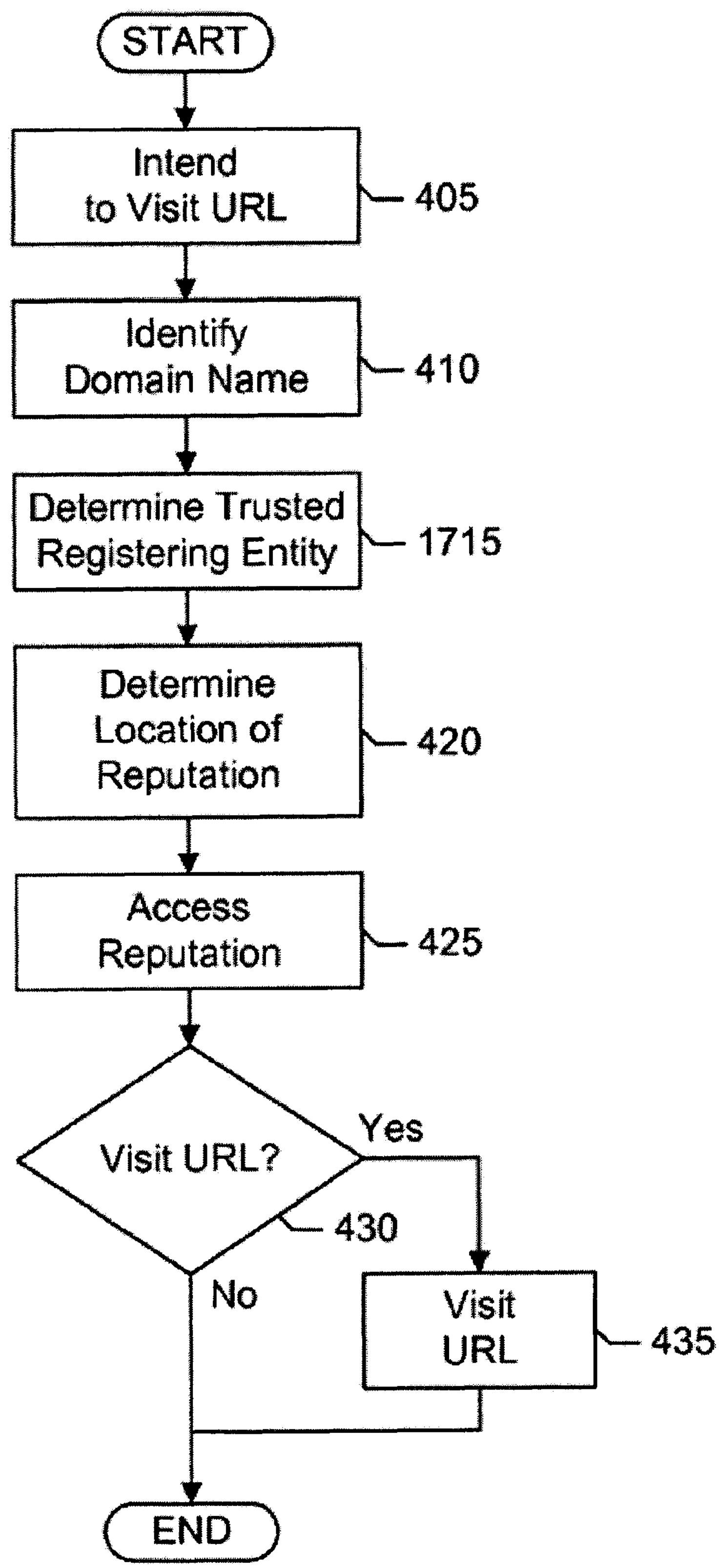
FIG. 17 is a flowchart illustrating a method of the present invention for accessing domain name related reputation before visiting a URL, using Trusted Registering Entity.
Figure 18:
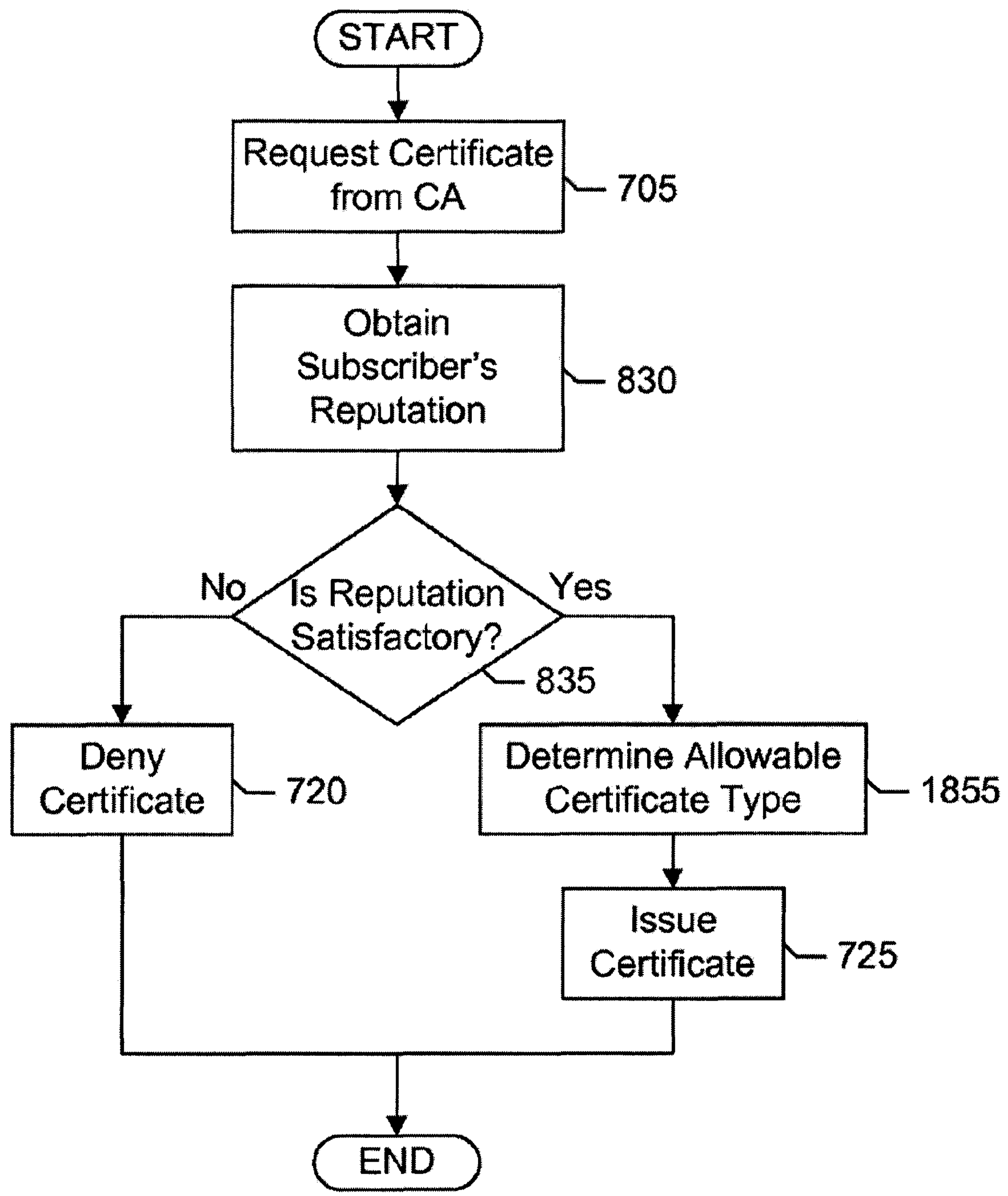
FIG. 18-21 are flowcharts illustrating methods of the present invention for determining allowable certificate type and issuing a secure certificate.
Figure 19:
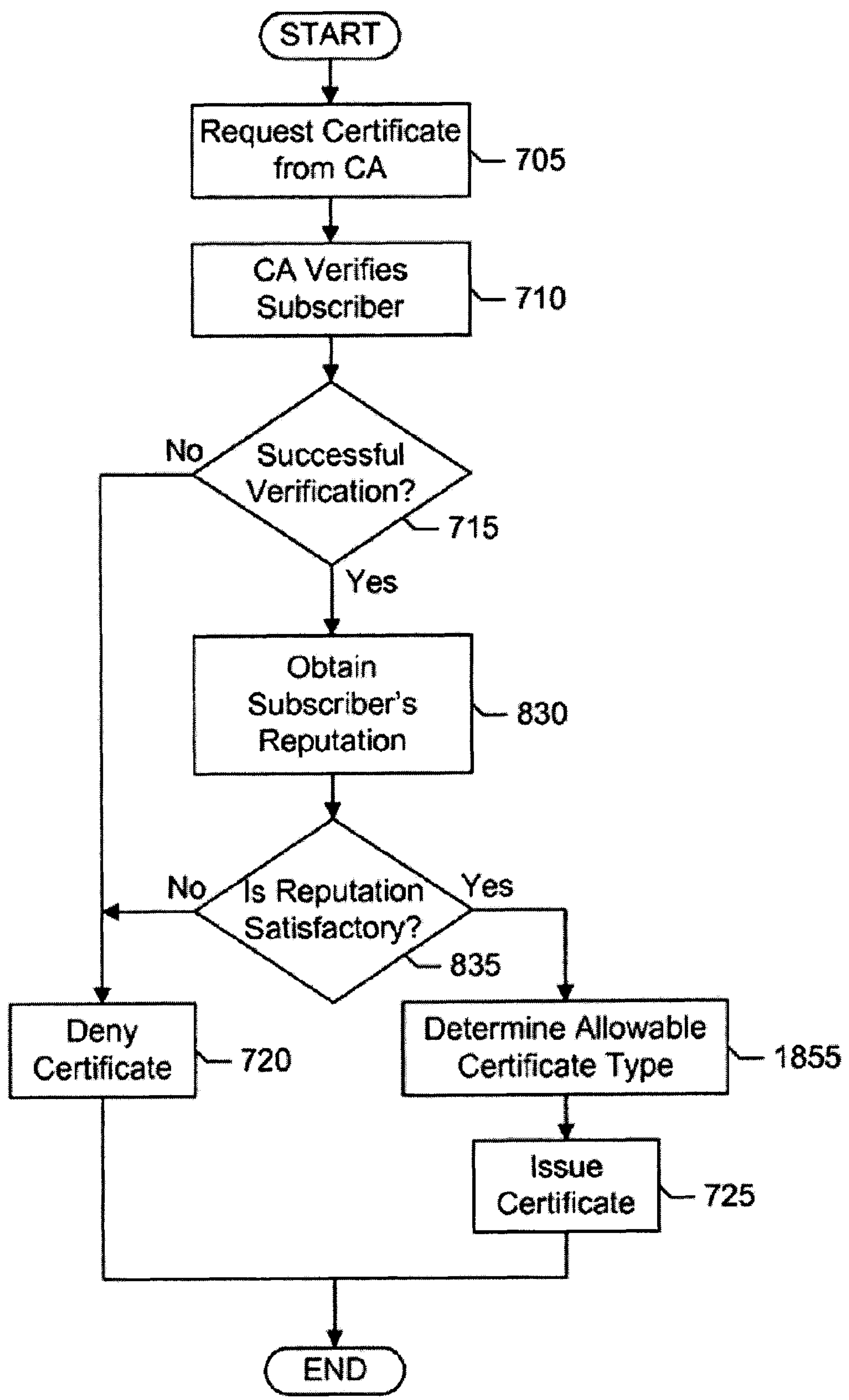
Figure 20:
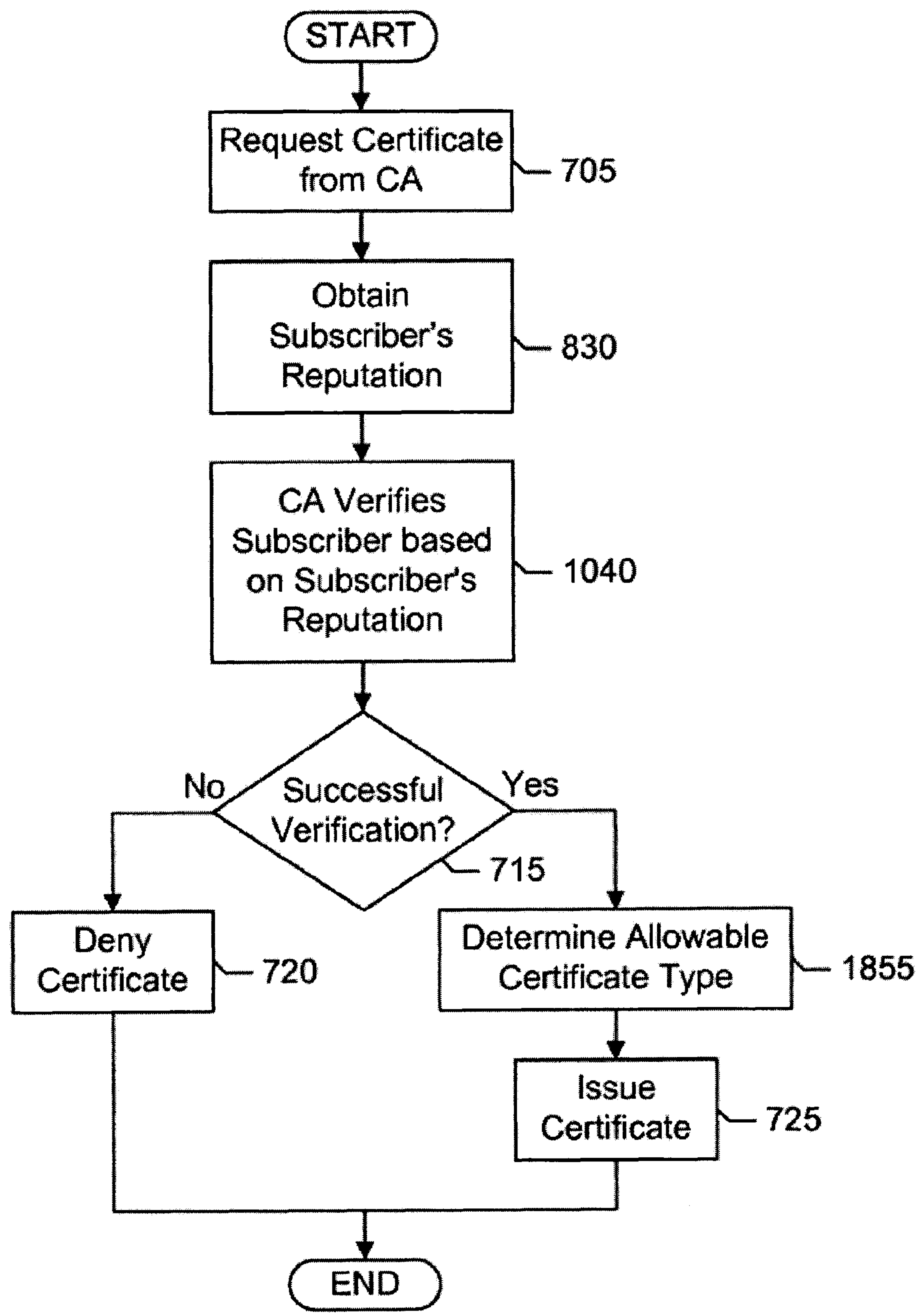
Figure 21:
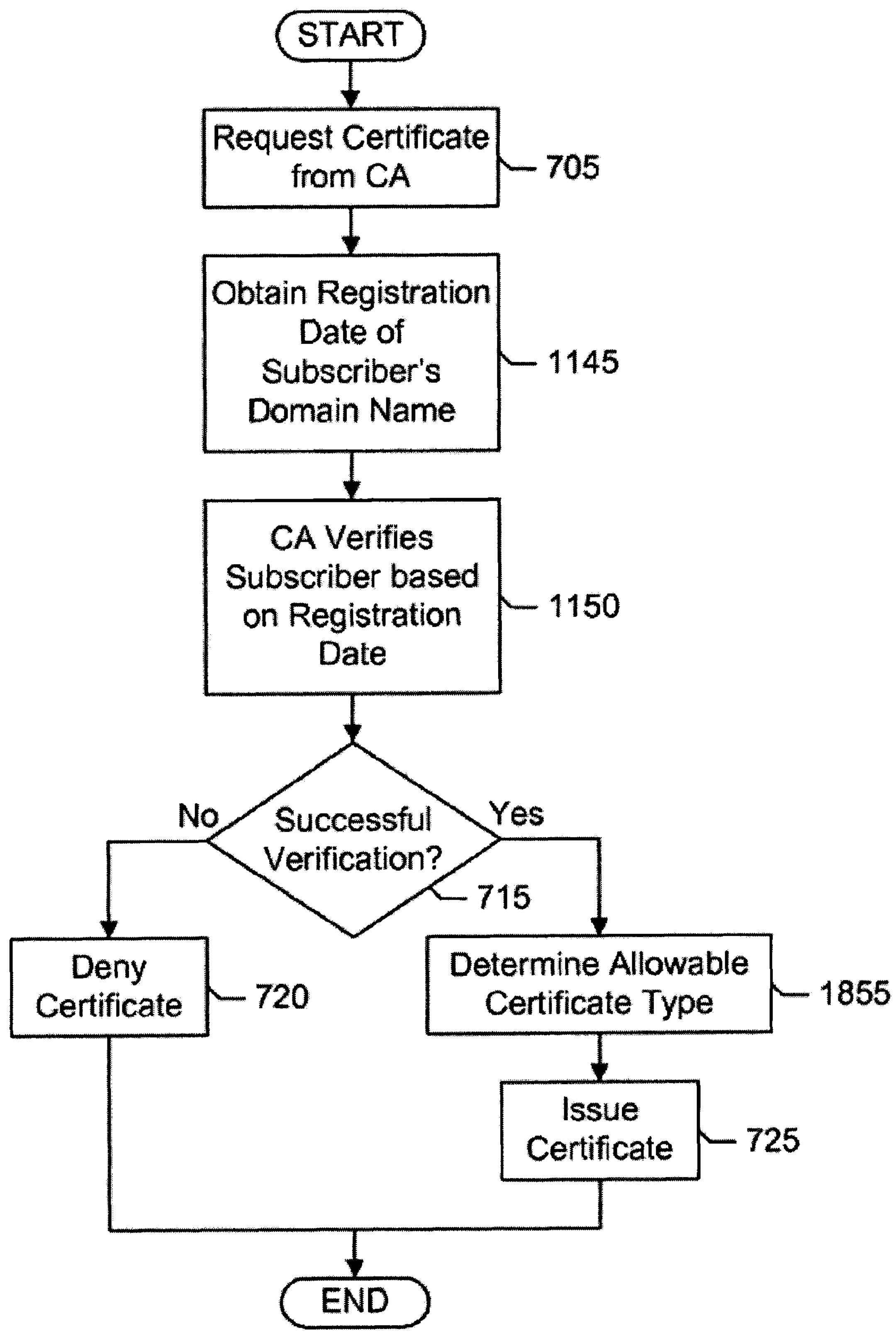

Alternatively, as shown in FIG. 17, the Requester may determine a Trusted Registering Entity for the domain name (Step 1715). The Trusted Registering Entity may be different from the Registering Entity with which the domain name is registered.

Each URL may have its own reputation rating. This is especially advantageous when multiple parties are responsible for the content of a website associated with the domain name.

The Registering Entity or another party may publish domain name related reputation data in the DNS or WHOIS records. The reputation values (ratings, scores) or one or more URL links, where the reputation values can be found, may be published in the DNS or WHOIS records. The party that tries to access domain name related reputation data may obtain it, inter alia, from a predetermined URL on the Internet or from the DNS or WHOIS records. One embodiment of the method for publishing the domain name related reputation in the WHOIS records includes the following steps. The Registering Entity collects domain name related information and forms domain name related reputation data. Then, the Registering Entity stores the domain name related reputation data in the WHOIS records.

The domain name related reputation may also be used for presenting search engines' results. Typically, the search engines' results presented to the network users (or automated solutions) are based on their relevance (e.g. how often search terms are found on a webpage), date last updated, number of links to that webpage, etc. In the method of the present invention the network search engines may use reputation ratings as one of the parameters to be considered for sorting or ordering search results. Alternatively, links to the domain names with a low reputation may be excluded from the search results. An embodiment of the method for presenting search engine results based on the domain name related reputation includes the following steps. An Inquirer posts a search query to a search engine. The search engine forms search engine results based, at least in part, on the domain name related reputation and returns the results to the Inquirer. The Inquirer may be a network user or an automated service querying the search engine. Search engine results may include links to websites, web pages, or documents on the networks. The networks may include the Internet.

Alternatively or additionally, reputation ratings (scores, values) may be shown next to (or in conjunction with) the links in the search engine results. Thus, allowing the network user to determine whether to visit the link or not. Further, the search engines may use domain name related reputation from various databases and sources, including those maintained by the Registering Entities.

The search engine may store reputation data with the links to the network documents and web pages. This may speed up the process of returning the search engine results to the Inquirer.

Figure 6:
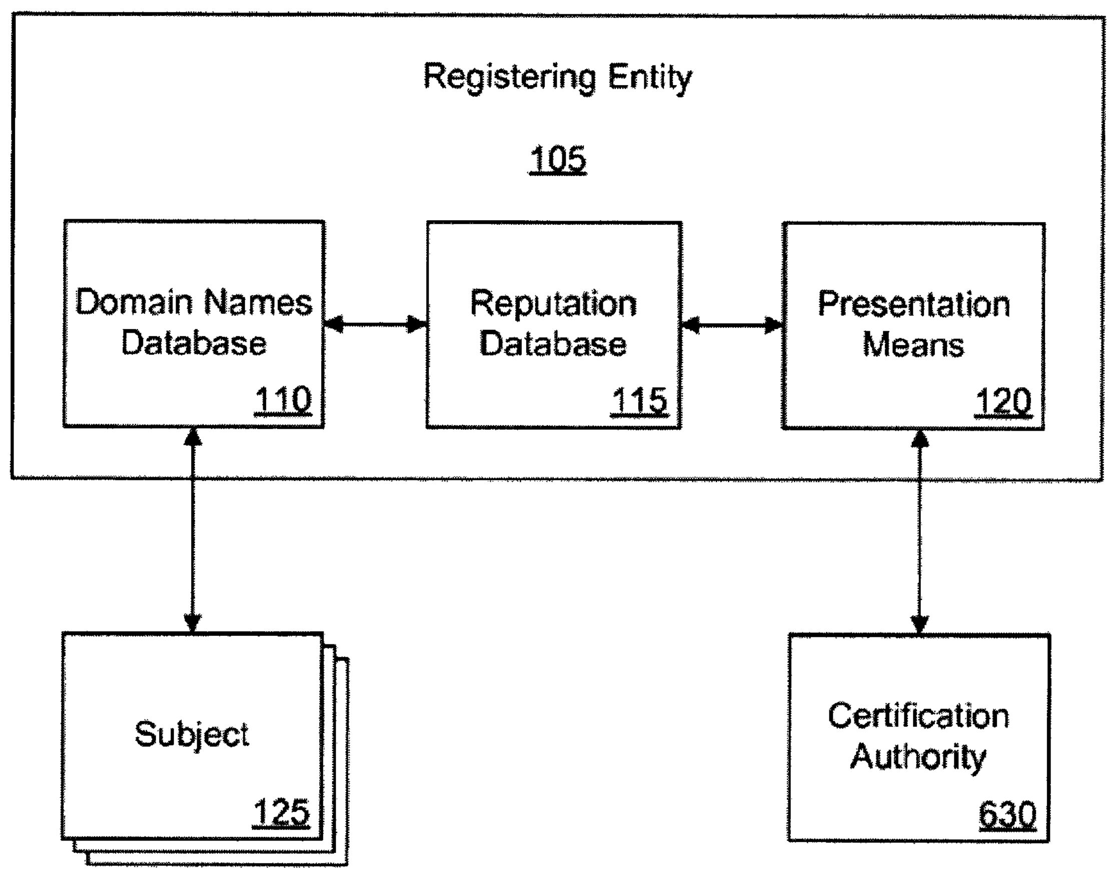
FIG. 6 is a block diagram illustrating an alternative embodiment of the system of the present invention.

An alternative embodiment of the system of the present invention is illustrated in FIG. 6. The system may include a Registering Entity 105, a Domain Names Database 110, a Reputation Database 115, a Presentation Means 120, a Subject 125, and a Certification Authority 630. The Registering Entity 105 may be a domain name Registry, a Registrar of domain names, or a Reseller of a Registrar. The Registering Entity 105 may be an accredited ICANN (Internet Corporation for Assigned Names and Numbers) Registry or Registrar. Examples of ICANN-accredited Registrars include GoDaddy.com, Wild West Domains, etc. The Registering Entity 105 maintains the Domain Names Database 110. The Domain Names Database 110 contains one or more domain names registered through or with the Registering Entity 105 or registered through or with another party. The Subject 125 is a person or an entity associated with one or more domain names registered through the Registering Entity 105.

The Certification Authority 630 may use data saved in the Reputation Database 115 to verify subscribers requesting secure certificates from the Certification Authority 630. Alternatively or additionally, the Certification Authority 630 may refuse to issue a secure certificate to a subscriber (or associated domain name) with a low reputation.

Alternatively, the Certification Authority 630 may have direct access to the Reputation Database 115 and/or the Domain Names Database 110. The Certification Authority 630 and the Registering Entity 105 may be the same or related companies, or may be unrelated, but cooperate with each other.

Figure 13:
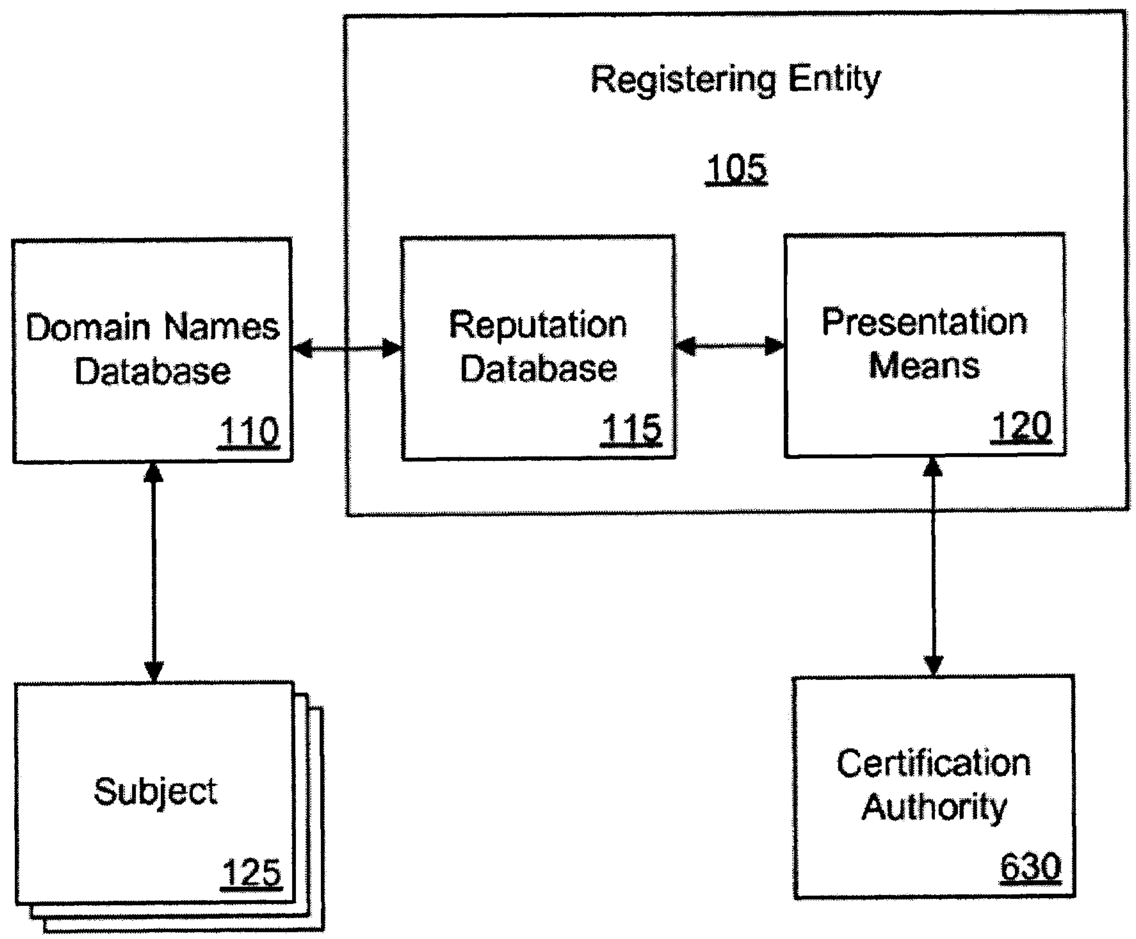

Further, as shown in FIGS. 13 and 14, the Domain Names Database 110 may be maintained by an entity other than the Registering Entity 105, e.g., by a third party registering entity (a First Registering Entity 1435). The Domain Names Database 110 contains one or more domain names registered through or with the Registering Entity 105 or registered through or with another party.

Figure 7:
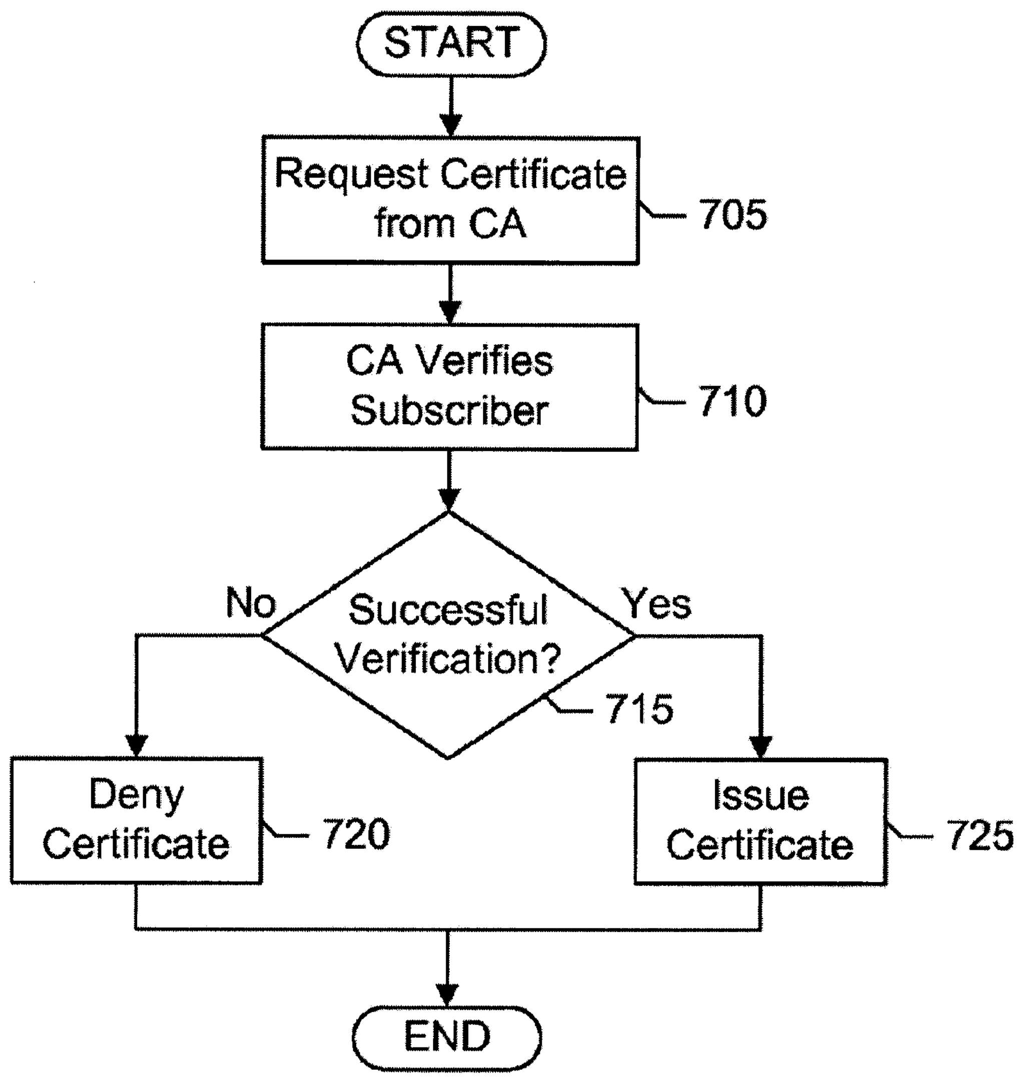
FIG. 7 is a flowchart illustrating a prior art method for issuing a secure certificate.

FIG. 7 illustrates a prior art method for issuing a secure certificate. A Subscriber requests a secure certificate from a Certification Authority (Step 705). The Certification Authority verifies the Subscriber (Step 710). If the Subscriber was verified successfully (Step 715), the Certification Authority issues the secure certificate (Step 725). If verification was unsuccessful, the issuance of the secure certificate will be denied (Step 720).

Figure 8:
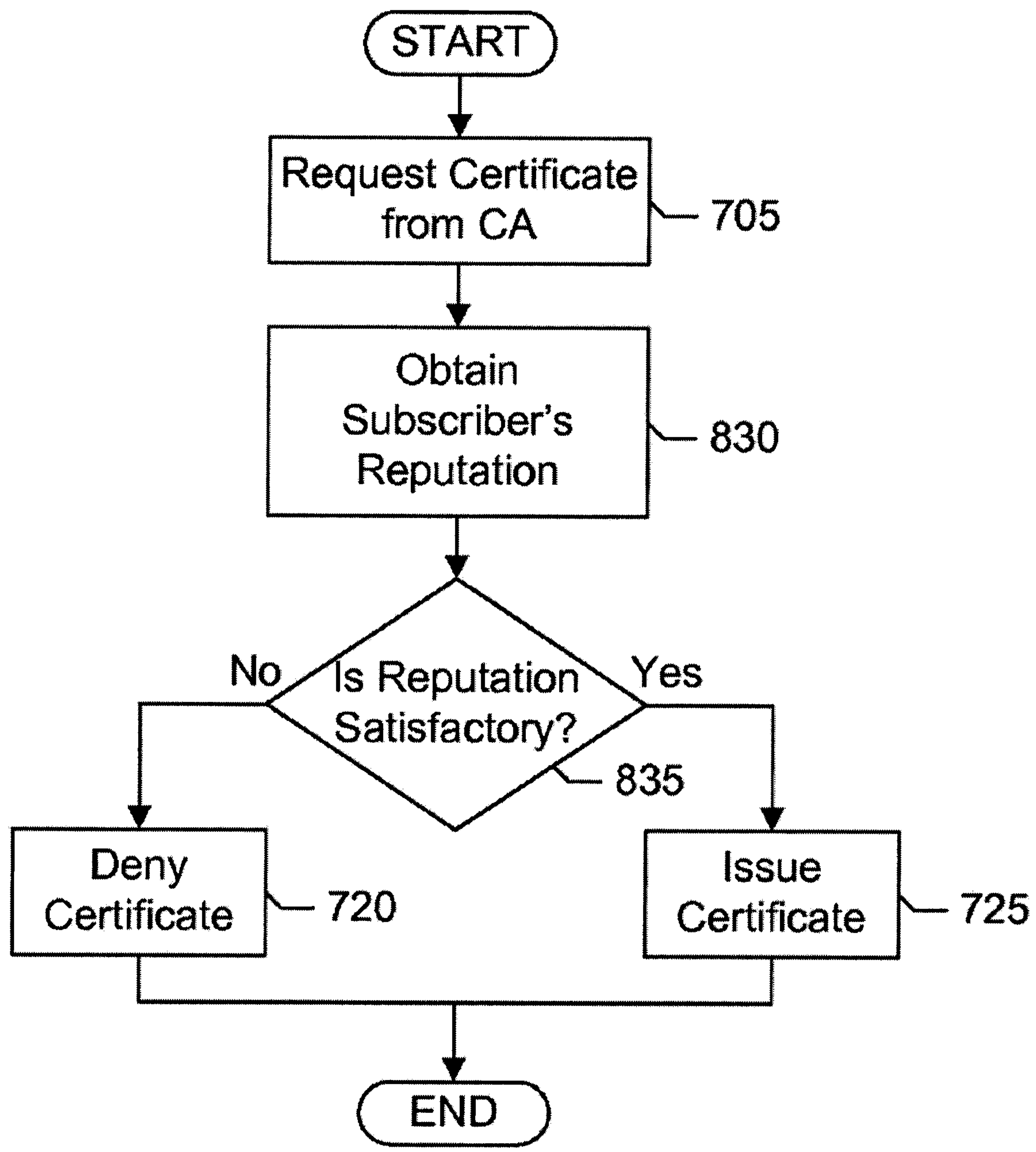
FIG. 8-11 are flowcharts illustrating methods of the present invention for issuing a secure certificate.

FIG. 8 shows a sample method for issuing a secure certificate using domain name related reputation. A Subscriber requests a secure certificate from a Certification Authority (Step 705). The Certification Authority obtains a Subscriber's domain name related reputation (Step 830). If the Subscriber's domain name related reputation is satisfactory (Step 835), the Certification Authority issues the secure certificate (Step 725). If the reputation is not satisfactory, the issuance of the secure certificate will be denied (Step 720). If the reputation is represented by a numeric value, the reputation may be considered satisfactory if it exceeds a predetermined value.

Figure 9:
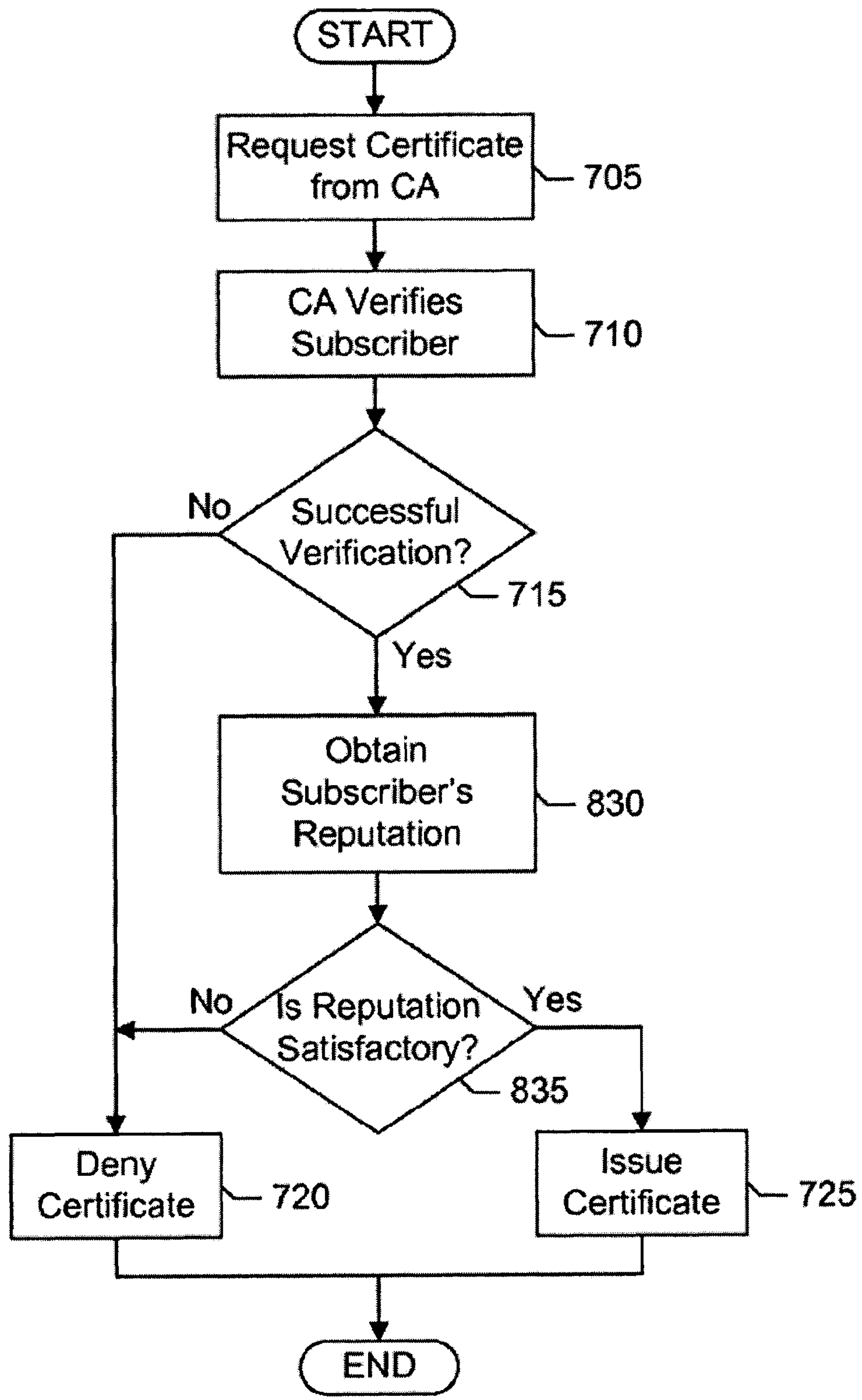

FIG. 9 shows another sample method for issuing a secure certificate using domain name related reputation. A Subscriber requests a secure certificate from a Certification Authority (Step 705). The Certification Authority verifies the Subscriber (Step 710). If the Subscriber was not verified successfully (Step 715), the Certification Authority denies the secure certificate (Step 720). If the Subscriber was verified successfully (Step 715), the Certification Authority obtains a Subscriber's domain name related reputation (Step 830). If the Subscriber's domain name related reputation is satisfactory (Step 835), the Certification Authority issues the secure certificate (Step 725). If the reputation is not satisfactory, the issuance of the secure certificate will be denied (Step 720).

Figure 10:
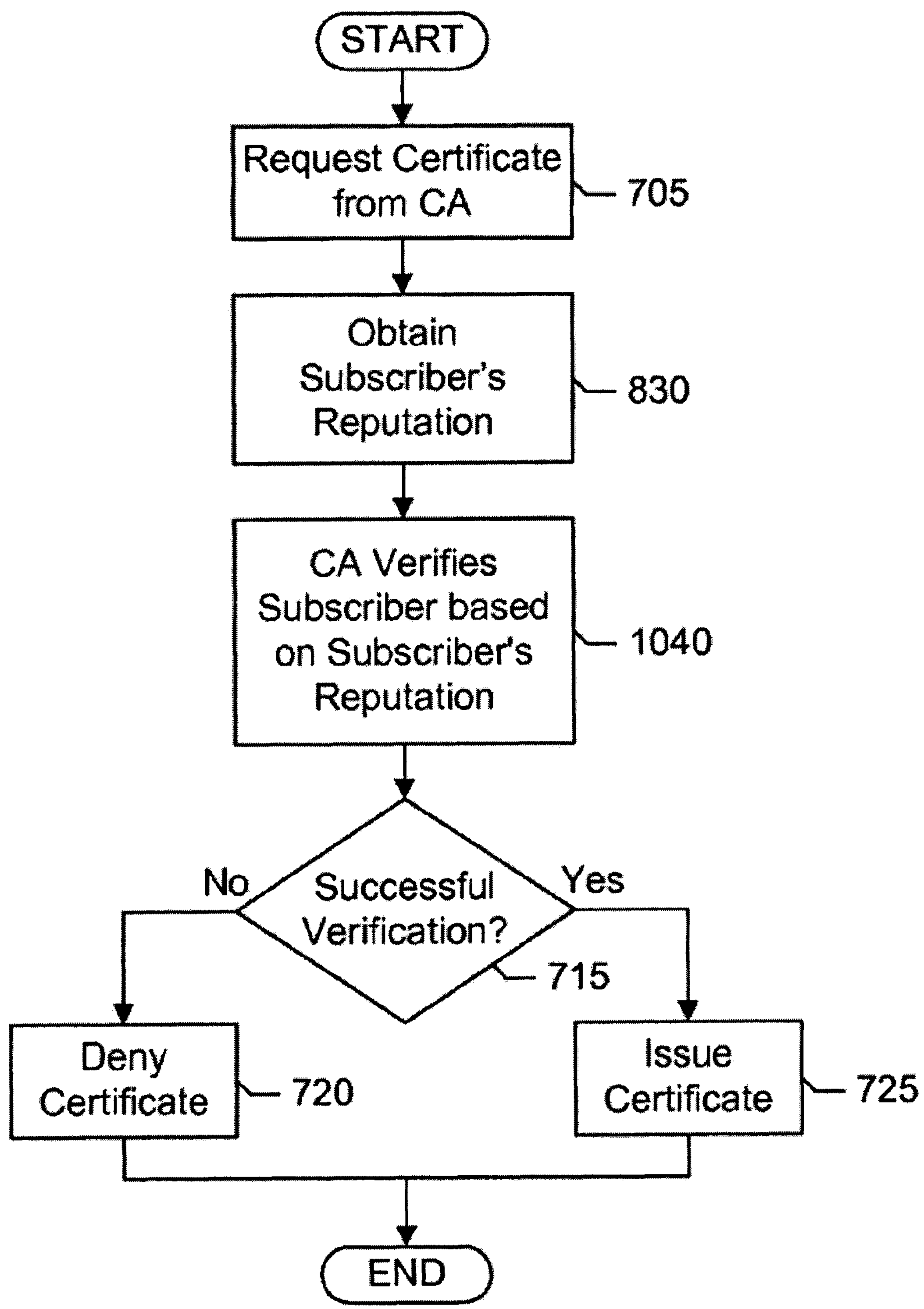

FIG. 10 illustrates another sample method for issuing a secure certificate. A Subscriber requests a secure certificate from a Certification Authority (Step 705). The Certification Authority obtains a Subscriber's domain name related reputation (Step 830). The Certification Authority verifies the Subscriber using a level of verification determined as a function of the Subscriber's reputation (Step 1040). Typically, the better the Subscriber's reputation, the less rigorous the verification needs to be. If the Subscriber was verified successfully (Step 715), the Certification Authority issues the secure certificate (Step 725). If verification was unsuccessful, the issuance of the secure certificate will be denied (Step 720).

Figure 11:
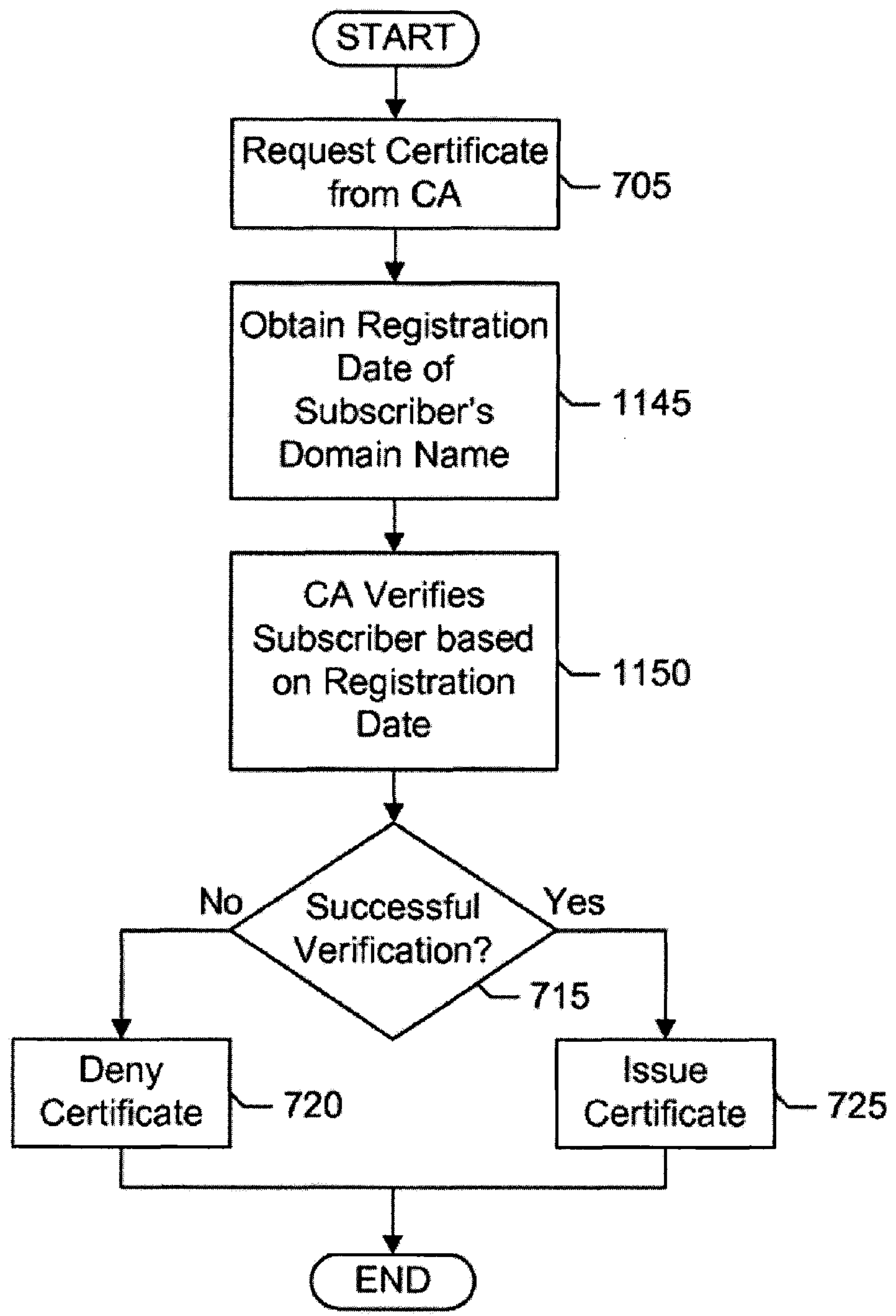

FIG. 11 illustrates another sample method for issuing a secure certificate. A Subscriber requests a secure certificate from a Certification Authority (Step 705). The Certification Authority obtains a registration date of the Subscriber's domain name (Step 1145). The Certification Authority verifies the Subscriber using a level of verification determined as a function of the registration date of the Subscriber's domain name (Step 1150). Typically, the earlier the registration date, the less rigorous the verification needs to be. If the Subscriber was verified successfully (Step 715), the Certification Authority issues the secure certificate (Step 725). If verification was unsuccessful, the issuance of the secure certificate will be denied (Step 720). This method may be performed without accessing the reputation database as described earlier in the specification.

Alternatively or additionally, the level of verification may be a function of a date of last renewal, a date of last transfer, a date of last changes in the WHOIS records, etc.

Further, as shown in FIG. 18-21, the type of the allowable secure certificate may be determined from the domain name related reputation data (Step 1855). The certificate type may include: Extended Validation (EV), regular validation, domain validation only, Server-Gated Cryptography (SGC), Advanced Encryption Standard (AES), Secure Site, Managed PKI, Wildcard, Pro, Standard, Turbo, Quick, Basic certificates, etc. Typically, the higher reputation ratings would allow for a more advanced certificate type.

In one implementation, the present disclosure provides a method including calculating, by at least one server communicatively coupled to a network, a rating for a domain name. The rating is based in part on reputation data for the domain name. The method includes receiving, by the at least one server, a domain name query from a requester, and forming, by the at least one server, a listing of candidate domain names using the domain name query. An inclusion of the domain name into the listing of candidate domain names or an order placement of the domain name within the listing of candidate domain names is a function of the rating for the domain name. The method includes returning, by the at least one server, the listing of candidate domain names to the requester.

In another implementation, the present disclosure provides a method including receiving, by at least one server communicatively coupled to a network, a request for a domain name from a requester, identifying, by the at least one server, a plurality of candidate domain names relevant to the request, and calculating, by the at least one server, a reputation rating for each one of the plurality of candidate domain names. The method includes displaying, by the at least one server, a user interface depicting the plurality of candidate domain names and an indication of the reputation rating of each one of the plurality of candidate domain names.

In another implementation, the present disclosure provides a method including identifying, by at least one server, a domain name, calculating, by the at least one server, a reputation rating for the domain name, and storing, by the at least one server, the reputation rating in a memory.

As a non-limiting example, the steps described above (and all methods described herein) may be performed by any central processing unit (CPU) or processor in a computer or computing system, such as a microprocessor running on a server computer, and executing instructions stored (perhaps as applications, scripts, apps, and/or other software) in computer-readable media accessible to the CPU or processor, such as a hard disk drive on a server computer, which may be communicatively coupled to a network (including the Internet). Such software may include server-side software, client-side software, browser-implemented software (e.g., a browser plugin), and other software configurations.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:

calculating, by at least one server communicatively coupled to a network, a rating for a domain name for registration, wherein the rating is calculated based in part on reputation data for the domain name and the reputation data is accumulated by:

determining a length of time that the domain name has been registered;

determining an amount of spam, viruses, or phishinq email messages that originated from email accounts or websites of the domain name;

determining a number of complaints about the domain name;

determining whether website content of the domain name relates to illegal content;

determining whether the domain name has been issued a certified security certificate; and determining whether a registering entity has validated contact information of a registrant of the domain name;

receiving, by the at least one server, a domain name query from a requester;

forming, by the at least one server, a listing of candidate domain names using the domain name query, wherein an inclusion of the domain name into the listing of candidate domain names or an order placement of the domain name within the listing of candidate domain names is a function of the rating for the domain name; and returning, by the at least one server, the listing of candidate domain names to the requester.

2. The method of claim 1, wherein the reputation data is based on an event associated with the domain name.

3. The method of claim 2, wherein the event associated with the domain name includes a complaint about unsolicited email originated from the domain name.

4. The method of claim 2, wherein the event associated with the domain name includes a complaint about illegal content on a website hosted on the domain name.

5. The method of claim 2, wherein the event associated with the domain name includes a transfer of the domain name.

6. A method, comprising:

receiving, by at least one server communicatively coupled to a network, a request to identify a plurality of candidate domain names for registration from a requester;

identifying, by the at least one server, the plurality of candidate domain names relevant to the request;

calculating, by the at least one server, a reputation rating for each one of the plurality of candidate domain names, wherein the reputation rating is calculated based on historical data associated with each one of the plurality of candidate domain names and the historical data is accumulated by at least one of determining a length of time that the each one of the plurality of candidate domain names has been registered;

determining an amount of spam, viruses, or phishing email messages that originated from email accounts or websites of the each one of the plurality of candidate domain names;

determining a number of complaints about the each one of the plurality of candidate domain names;

determining whether website content of the each one of the plurality of candidate domain names relates to illegal content;

determining whether the each one of the plurality of candidate domain names has been issued a certified security certificate; and determining whether a registering entity has validated contact information of a registrant of the each one of the plurality of candidate domain names; and displaying, by the at least one server, a user interface depicting the plurality of candidate domain names and an indication of the reputation rating of the each one of the plurality of candidate domain names.

7. The method of claim 6, wherein the reputation rating of each one of the plurality of candidate domain names is at least partially determined by a value for fraudulent activities associated with the at least one domain name.

8. The method of claim 6, including, displaying on the user interface for at least one of the plurality of candidate domain names an icon, wherein the icon is indicative of the reputation rating for the at least one of the plurality of candidate domain names.

9. The method of claim 8, wherein the icon indicates that the at least one of the plurality of candidate domain names has a reputation for sending spam messages.

10. The method of claim 8, wherein the icon indicates that the at least one of the plurality of candidate domain names has a reputation for hosting viruses.

11. The method of claim 8, wherein the icon indicates that the at least one of the plurality of candidate domain names is associated with an amount of traffic exceeding a threshold.

12. The method of claim 6, wherein the indication of the reputation rating of each one of the plurality of candidate domain names is an order in which the plurality of candidate domain names are depicted.

13. The method of claim 6, wherein the request for the domain name identifies the domain name.

14. The method of claim 6, wherein the request for the domain name includes keywords.

15. A method, comprising:

identifying, by at least one server, a domain name for registration;

calculating, by the at least one server, a reputation rating for the domain name;

wherein the reputation rating is calculated based on historical data associated with the domain name and the historical data is accumulated by at least one of determining a length of time that the domain name has been registered;

determining an amount of spam, viruses, or phishinq email messages that originated from email accounts or websites of the domain name;

determining a number of complaints about the domain name;

determining whether website content of the domain name relates to illegal content;

determining whether the domain name has been issued a certified security certificate; and determining whether a registering entity has validated contact information of a registrant of the domain name; and storing, by the at least one server, the reputation rating in a memory.

16. The method of claim 15, wherein the reputation rating of the domain name is at least partially determined by a value for fraudulent activities associated with the domain name.

17. The method of claim 15, wherein identifying the domain name includes receiving, by the at least one server, a request from a requester, the request identifying the domain name.

18. The method of claim 15, including generating, by the at least one server, a user interface including the domain name and a representation of the reputation rating.

19. The method of claim 18, including, generating on the user interface an icon, wherein the icon is indicative of the reputation rating for the domain name.

20. The method of claim 19, wherein the icon indicates that the domain name has a reputation for sending spam messages.

21. The method of claim 19, wherein the icon indicates that the domain name has a reputation for hosting viruses.

22. The method of claim 19, wherein the icon indicates that the domain name is associated with an amount of traffic exceeding a threshold.

* * * * *